United States Patent [19]

Ajmera

[11] Patent Number: 4,882,119

[45] Date of Patent: Nov. 21, 1989

[54] METHOD FOR MAKING PARTIALLY CRYSTALLINE BIAXIALLY ORIENTED HEAT SET HOLLOW PLASTIC CONTAINERS

[75] Inventor: Prakash R. Ajmera, Toledo, Ohio

[73] Assignee: Owens-Illinois Plastic Products Inc., Toledo, Ohio

[21] Appl. No.: 64,649

[22] Filed: Jun. 22, 1987

[51] Int. Cl.[4] .................... B29C 49/12; B29C 49/18
[52] U.S. Cl. .................................................. 264/526
[58] Field of Search ............... 264/529, 530, 535, 542, 264/543, 526, 532; 425/538, 539, 541, 123, 125, 126 R, 526, 530, 533, 534

[56] References Cited

U.S. PATENT DOCUMENTS

| | | | |
|---|---|---|---|
| 3,587,133 | 6/1971 | Valyi | 425/526 |
| 3,872,203 | 3/1975 | Yoshikawa et al. | 425/526 |
| 3,970,419 | 7/1976 | Valyi | 264/537 |
| 4,073,847 | 2/1978 | Mehnert | 264/530 |
| 4,106,886 | 8/1978 | Sokolow | 425/526 |
| 4,151,248 | 4/1979 | Valyi | 264/537 |
| 4,155,974 | 5/1979 | Valyi | 264/537 |
| 4,197,073 | 4/1980 | Rees et al. | 264/537 |
| 4,219,526 | 8/1980 | Mehnert | 264/530 |
| 4,354,813 | 10/1982 | Collumbin | 264/535 |
| 4,522,779 | 6/1985 | Jabarin | 264/535 |
| 4,601,869 | 7/1986 | Harry et al. | 264/535 |

*Primary Examiner*—Jan H. Silbaugh
*Assistant Examiner*—Neil M. McCarthy

[57] ABSTRACT

A method including engaging the open end of a first plastic parison which is at a temperature within its molecular orientation temperature range, enclosing a hot mold which is at heat setting temperature about the parison at a first position, simultaneously enclosing a cold mold at a second position about a container previously blown in the hot mold to cool the previously blown container, expanding the plastic parison within the hot mold by internal pressurization through the open end to induce biaxial orientation of the plastic parison and force the plastic parison into intimate contact and conformance with the hot mold and to maintain contact by such internal pressurization between the mold and biaxially oriented container for a time sufficient to induce partial crystallization in the biaxially oriented container, moving the hot mold and the cold mold in unison to bring the hot mold to the second position and the cold mold to a third position during the expanding of the parison within the hot mold and during the cooling of the previously blown container in the cold mold, maintaining a lower internal pressurization of the container in the hot mold and exhausting the pressurization to atmospheric pressure in the cold mold, substantially simultaneously opening the hot mold and cold mold, moving the open hot mold to the first position and open cold mold to the second position.

27 Claims, 20 Drawing Sheets

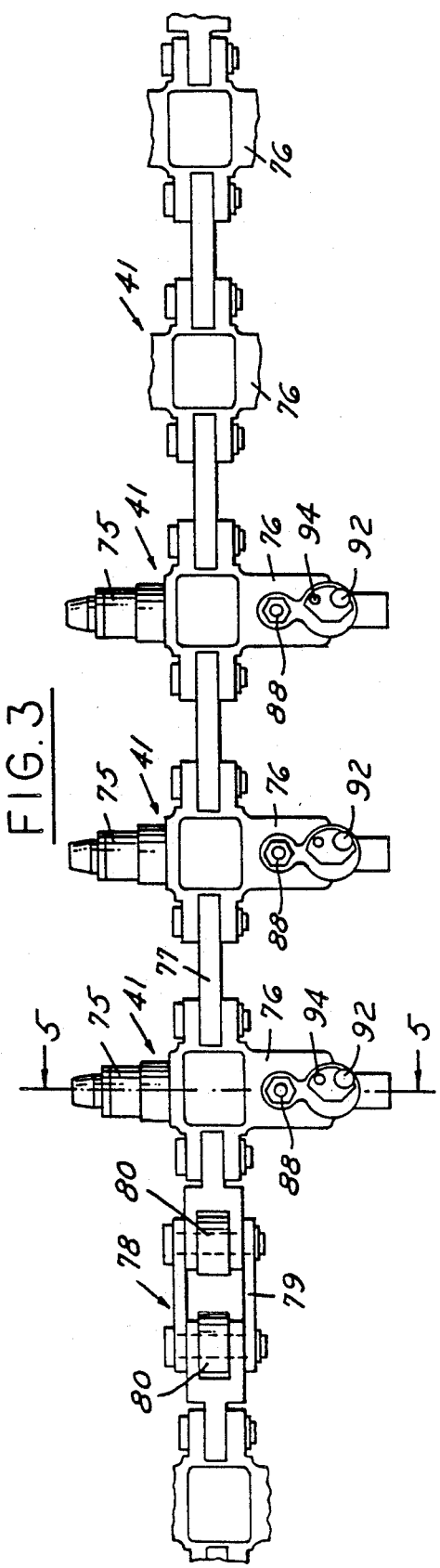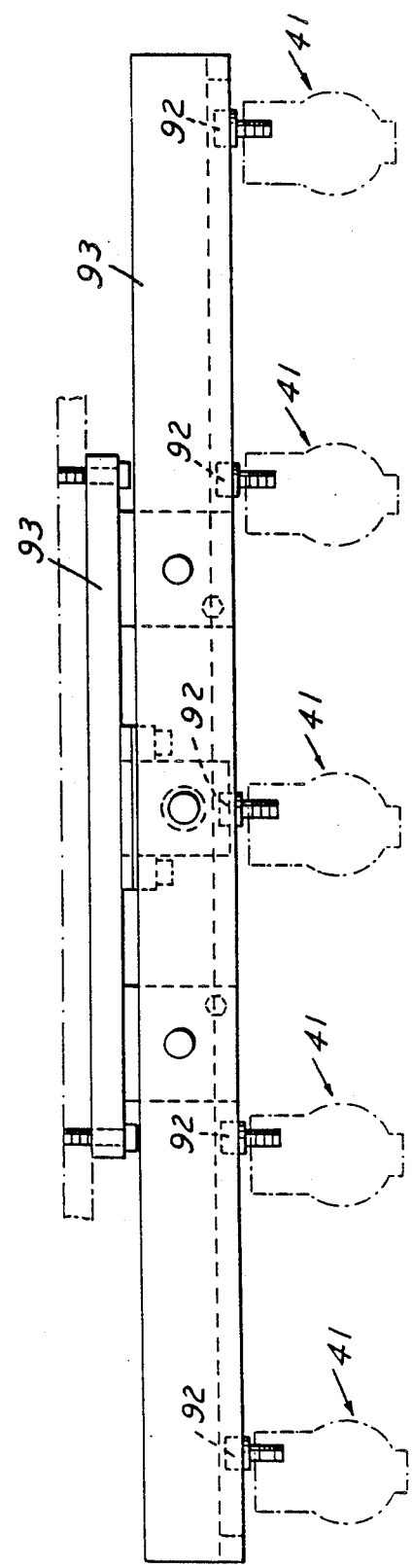

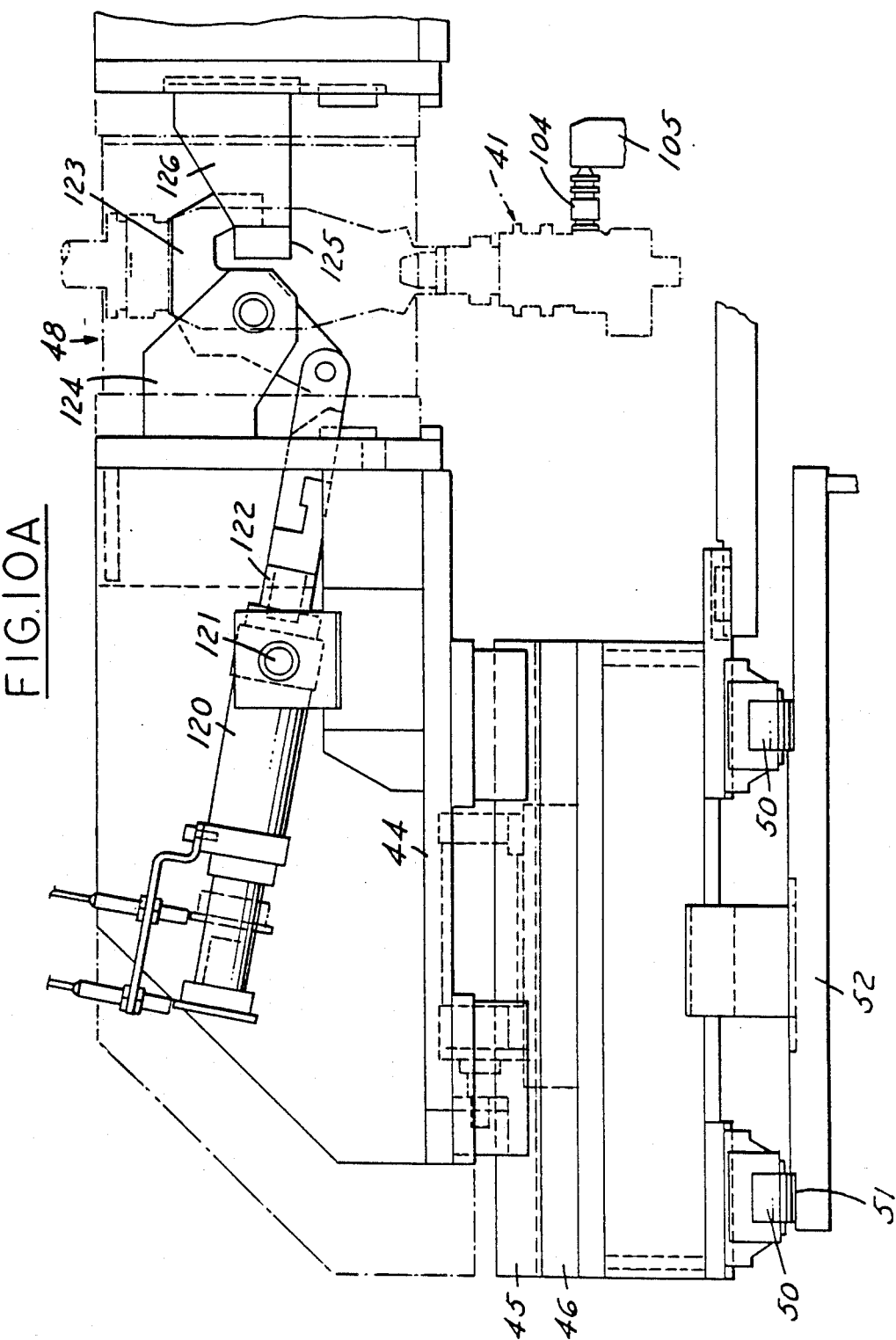

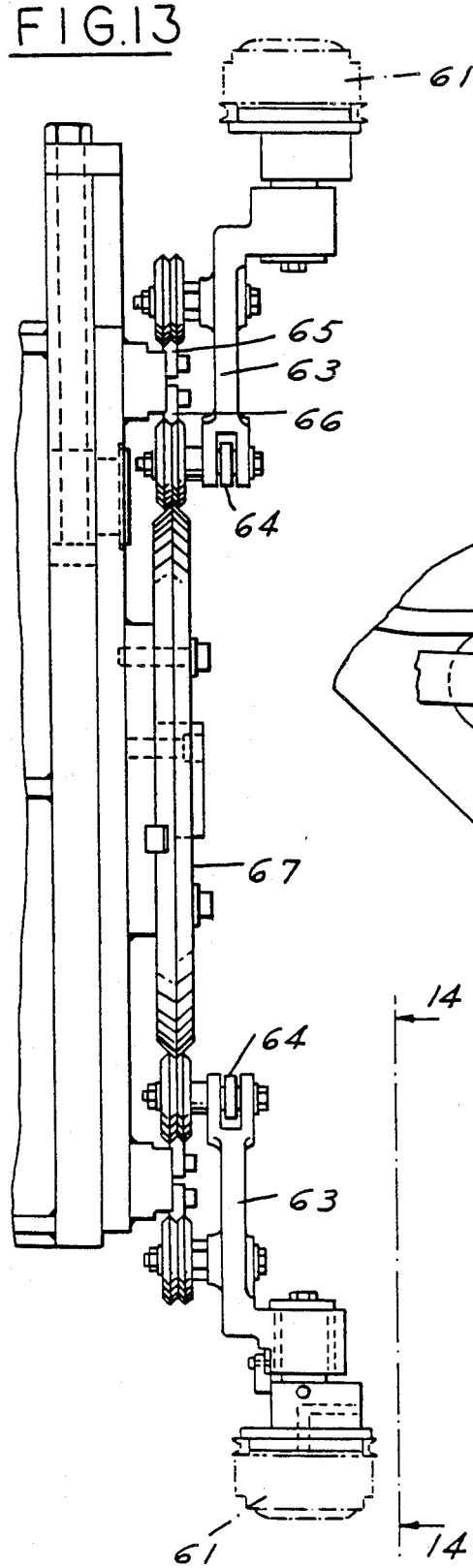
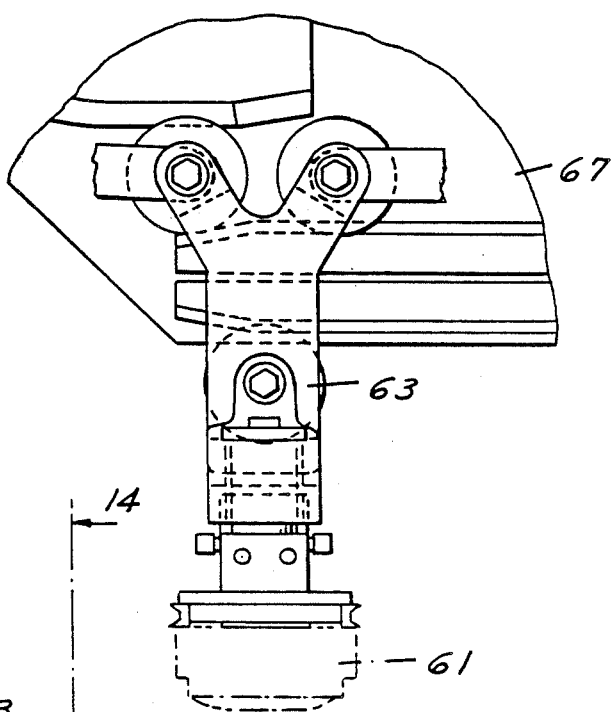
FIG.13
FIG.14

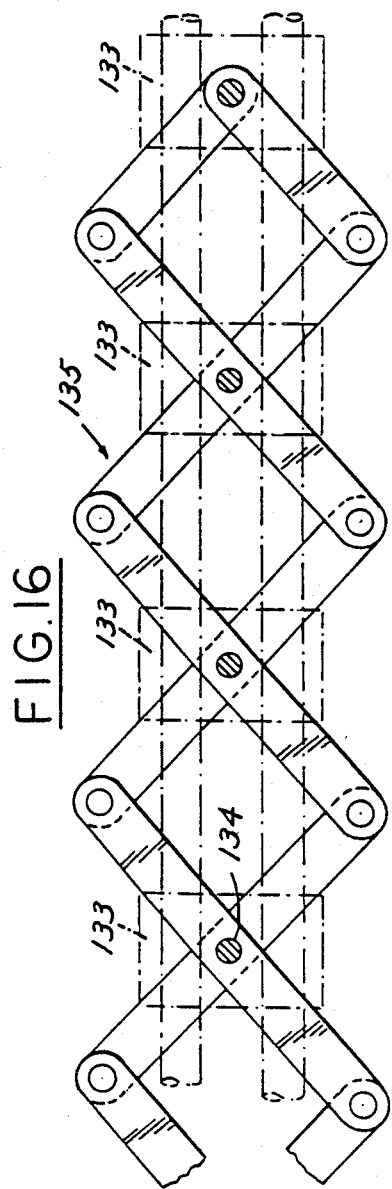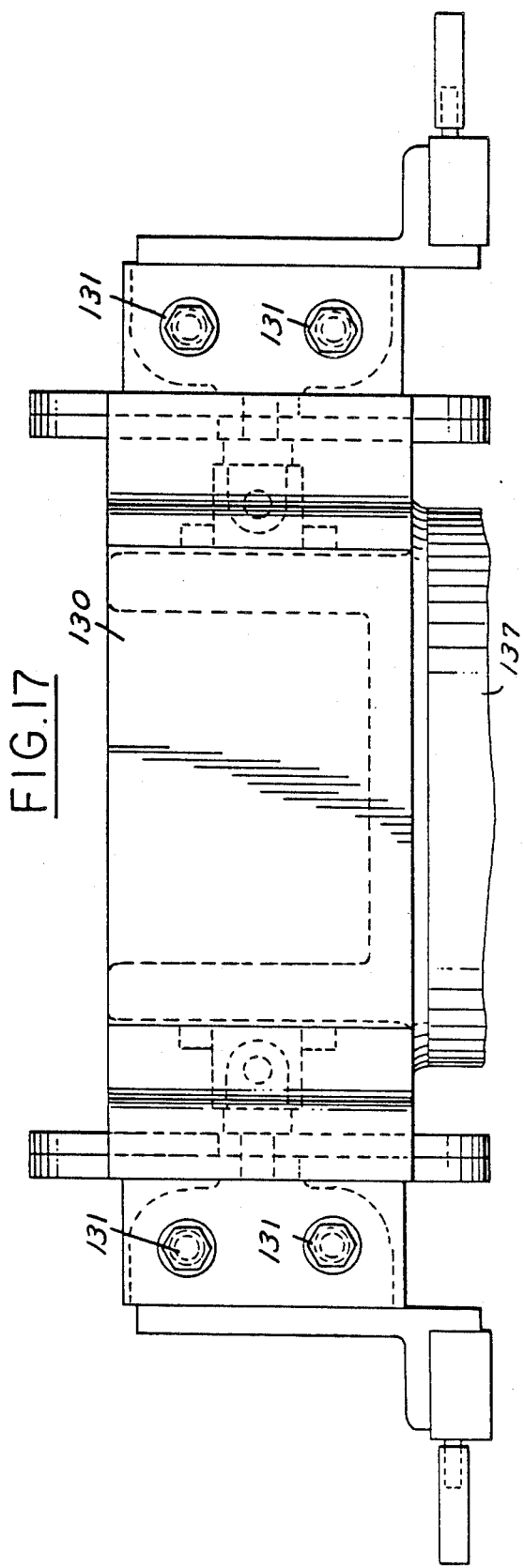

METHOD FOR MAKING PARTIALLY CRYSTALLINE BIAXIALLY ORIENTED HEAT SET HOLLOW PLASTIC CONTAINERS

This invention relates to making hollow biaxially oriented heat set partially crystalline articles and particularly articles made of polyethylene terephthalate.

BACKGROUND AND SUMMARY OF THE INVENTION

It has heretofore been known that the thermal stability and barrier properties of oriented blow molded containers of polyethylene terephthalate are significantly increased by heat setting. Typical processes for heat setting are shown in U.S. Pat. Nos. 4,476,170, 4,512,948 and 4,522,779.

In U.S. Pat. Nos. 4,476,170 and 4,512,948, there are disclosed an article and a process of making an oriented and heat set blow molded container of polyethylene terephthalate. In the process, a preform preheated to a temperature suitable for orientation is biaxially stretched in a blow mold and then while the hollow container is still in contact with the blow mold walls, the article is raised to a higher heat setting temperature preferably in the range of 200°-250° C. (except for the neck) thus heat setting the container, and while the container is still at a shrinkage resisting pressure exceeding atmospheric, it is cooled in the same mold to a temperature at which it maintains its shape when not pressurized but not below 100° C. It is also disclosed that this cooling step can be done in the air outside the mold while maintaining internal pressure. According to these patents, when the heat setting temperature of the hot mold ranges from 220-250° C. and the quenching temperature is not below 100° C., higher onset-of-shrinkage temperatures are obtained.

In U.S. Pat. No. 4,522,779, there are disclosed improved plastic containers and a process for their production. In the first embodiment, a container is blow molded in a first hot blow mold, then reblown to a larger size in a second cold mold of larger volume than the first hot mold. Such containers are stated as having improved mechanical properties, particularly very high hoop yield stresses. However, the utilization of a larger volume cold mold substantially reduces the thermal stability. In the second embodiment, a container is blow molded in a hot blow mold, then reblown to a larger size in a second hot blow mold where it is blown to the confines of the second mold and the container is then removed from the second hot mold and transferred to a third cold mold and cooled to room temperature while maintaining internal pressure. In a further embodiment, the container is blow molded in a first hot mold, reblown in a second hot mold, and thereafter the second mold is cooled to cool the container.

U.S. Pat. No. 4,385,089 (British Patent Specification 1,604,203) is directed to heat set biaxially oriented hollow articles and states that the preform or parison should be heated at least to biaxially oriented temperature and maintained in closed contact with a hot mold which is at a temperature of up to 40° C. above the minimum orientation temperature. In one embodiment, the resultant molded hollow article is moderately cooled causing a temperature drop of 10-30° C. by introducing cooling vapor or mist into the hollow article, interrupting the cooling vapor, and opening the mold. In another embodiment, the heat set article is allowed to shrink freely and then reblown in the same hot mold or in a separate cooled mold. The patent calls for a heat setting temperature of 40° C. above the orientation temperature which limits thermal stability and barrier properties.

According to this patent, the temperature of the hot mold should be maintained between 30 and 50° C. above the minimum orientation temperature of the plastic material. Otherwise, it is stated there are numerous disadvantages including lowering of the production rate, the danger of the appearance of major distortion and major shrinkage on mold release, the disadvantage inherent in heating metal molds to very high temperatures and keeping them at such temperature, and the danger of crystallization which would cause a loss of transparency. Further, in accordance with this prior patent, excessive shrinkage is to be avoided and generally the temperature drop of 10 to 30° C. should be made. Accordingly, such a method precludes obtaining a degree of heat setting which would produce thermal stability at higher temperature as may be required in filling the container with various products. In addition, such a method will preclude obtaining the higher degrees of crystallinity and resultant high barrier properties which are required for some products.

In copending application Ser. No. 923,503 filed Oct. 27, 1986, having a common assignee with the present application, there are disclosed improved plastic containers and a method for their manufacture. In this method, the container is blow molded in the first hot mold which is maintained at 130-250° C., the container is in contact with the mold surface for a short period of time (1-10 sec.) which is sufficient to induce partial crystallization. The container is then maintained at lower internal pressure to prevent significant shrinkage and then the container is rapidly transferred into a cold mold having substantially the same volume or smaller volume than the hot mold. The temperature of the cold mold is maintained at 1-100° C. The container is quenched in the cold mold. The method results in a thermally stable container which has higher onset-of-shrinkage temperature and higher mechanical properties as required for hot fill applications. The method also provides lower cycle time.

Where the base of the container is complex such as having axially projecting portions so that it is free standing or has an inverted bottom, transfer from a hot mold to a cold mold, while the interior of the container is under pressure, tends to deform the bottom and cause it to revert to a hemispherical bottom. This tends to occur both when the blown container is maintained stationary and when the container is moved from a hot mold to a cold mold.

To overcome these problems in copending application Ser. No. 021,894, filed Mar. 4, 1987, now U.S. Pat. No. 4,839,127, having a common assignee with the present application, there is disclosed a method for making a partially crystalline, biaxially oriented heat set hollow plastic container from a hollow parison having an open end and a closed end comprising engaging the open end of a plastic parison which is at a temperature within its molecular orientation temperature range, positioning a mold base in axial alignment with said engaged hot parison, enclosing a hot mold about the mold base, the mold being at neat setting temperature, expanding the plastic parison within the hot mold and mold base by internal pressurization to induce biaxial orientation of the plastic parison and force the plastic parison into intimate contact and conformance with the hot mold and to maintain contact by such internal pressurization between the mold and the biaxially oriented container for a time sufficient to induce partial crystallization in the biaxially oriented container, reducing the internal pressure in the blown container, opening the hot mold while maintaining engagement of the open end and engagement of the mold base with the blown hollow container, maintaining a lower internal pressurization of the container to prevent significant shrinkage, and cooling the container while maintaining engagement of the open end and engagement of the mold base with the container and maintaining pressure in the container at least sufficient to prevent shrinkage.

In copending application Ser. No. 020,830, filed Mar. 2, 1987, and now abandoned, having a common assignee with the present application, there is disclosed a method for making a partially crystalline, biaxially oriented heat set hollow polyethylene terephthalate free standing container from a hollow parison having an open end and a closed end comprising engaging the open end of a plastic parison which is at a temperature within its molecular orientation temperature range, positioning a mold base in axial alignment with said engaged hot parison, enclosing a hot mold about the mold base, the mold being at heat setting temperature and the mold base being at a temperature preferably significantly lower than the mold, expanding the plastic parison within the hot mold and mold base by internal pressurization to induce biaxial orientation of the plastic parison and force the plastic parison into intimate contact and conformance with the hot mold and to maintain contact by such internal pressurization between the mold and mold base and the biaxially oriented container for a time sufficient to induce partial crystallization in the side wall and base of the biaxially oriented container, reducing the internal pressure in the blown container, opening the hot mold while maintaining engagement of the open end of the blown hollow container, disengaging the hot mold base from the blown container, maintaining a lower internal pressurization of the container to prevent significant shrinkage, and engaging a cold mold base with the base of the container, and enclosing a cold mold about the container and the mold base to cool the container while maintaining engagement of the open end with the container and maintaining pressure in the container at least sufficient to prevent shrinkage, and opening the cold mold and releasing the container.

In copending application Ser. No. 020,813, filed Mar. 2, 1987, and now abandoned, having a common assignee with the present application, there is disclosed a method and apparatus of forming a hollow partially crystalline heat set biaxially oriented polyethylene terephthalate container having a hemispherical base comprises blowing heated parison at orientation temperature outwardly against the confines of a mold which is at heat setting temperature wherein the side wall and the major portion of the base of the container are subjected to a heat setting temperature and the center of the base of the container is subjected to a temperature not greater than 150° C. so that the central portion is crystallized substantially lesser amount than the side wall and the major portion of the base. The container is then quenched. The resultant container can be formed at a rapid cycle and has good drop impact properties and obviates the problems of sticking to the hot mold or blow out when the hot mold is opened.

Although the methods set forth in the aforementioned applications Ser. Nos. 923,503, 021,894, 020,830, and 020,813 result in substantially less cycle times, the transfer of blown containers from the hot mold to the cold mold is by relative movement after the molds are opened and therefore is very critical. Care must be exercised to prevent distortion of the containers during transfer. Therefore, sufficient time must be allotted to transfer in order to prevent distortion and this limits the cycle time. It is desirable or commercial purposes to further decrease the cycle times. In addition, it is desirable to provide an apparatus which will commercially produce satisfactory containers at the minimum cycle times.

Accordingly among the objectives of the present invention are to provide a method and apparatus for making partially crystalline, biaxially oriented heat set hollow plastic containers at faster cycle times; which method and apparatus can be utilized to provide faster cycle times in accordance with any of the above-described methods which utilize a hot mold and a cold mold; to provide an apparatus which will make such containers in commercial quantities; to provide an apparatus which is capable of being selectively changed to perform each of a variety of methods; to provide an apparatus having a novel stretch and blow apparatus, and to provide an apparatus having a novel parison handling apparatus.

In accordance with the present invention, the method and apparatus for making a partially crystalline, biaxially oriented heat set hollow plastic container from a hollow parison of crystallizable material having an open end and a closed end comprises engaging the open end of a first plastic parison which is at a temperature within its molecular orientation temperature range, enclosing a hot mold about the parison at a first position, the mold being at heat setting temperature, simultaneously enclosing a cold mold at a second position about a previously blown container in the hot mold to cool the container, expanding the plastic parison within the not mold by internal pressurization through the open end to induce biaxial orientation of the plastic parison and force the plastic parison into intimate contact and conformance with the hot mold and to maintain contact by such internal pressurization between the mold and biaxially oriented container for a time sufficient to induce partial crystallization in the biaxially oriented container, moving the hot mold and the cold mold in unison to bring the hot mold to the second position and the cold mold to a third position during the expanding of the parison within the hot mold and during the cooling of the previously blown container in the cold mold, maintaining a lower internal pressurization of the container in the hot mold and exhausting the pressurization to atmospheric pressure in the cold mold, substantially simultaneously opening the hot mold add cold mold, moving the open hot mold to the first position and open cold mold to the second position, and enclosing the hot mold about a second plastic parison which is at a temperature within its molecular orientation temperature range, and enclosing the cold mold about a previously blown container from the first parison.

The method and apparatus can be adapted to the aforementioned method of U.S. Pat. No. 4,522,779 and the aforementioned patent applications Ser. Nos. 923,503, 021,894, 020,830 and 020,813 which are incorporated herein by reference.

DESCRIPTION OF THE DRAWINGS

FIG. 3 is a fragmentary side elevational view of a portion of a mandrel conveyor utilized in the apparatus.

FIG. 4 is a fragmentary plan view taken along the line 4—4 in FIG. 8.

FIGS. 10A and 10B are fragmentary views taken along the line 10—10 in FIG. 1.

FIG. 13 is a fragmentary view taken alone the line 13—13 in FIG. 12, parts being broken away FIG. 14 is a fragmentary view on an enlarged scale of a portion of the apparatus shown in FIG. 12.

FIG. 16 is a fragmentary sectional view taken along the line 16—16 in FIG. 16.

FIG. 17 is an end view taken along the line 17—17 in FIG. 15.

DESCRIPTION

Figure 24:
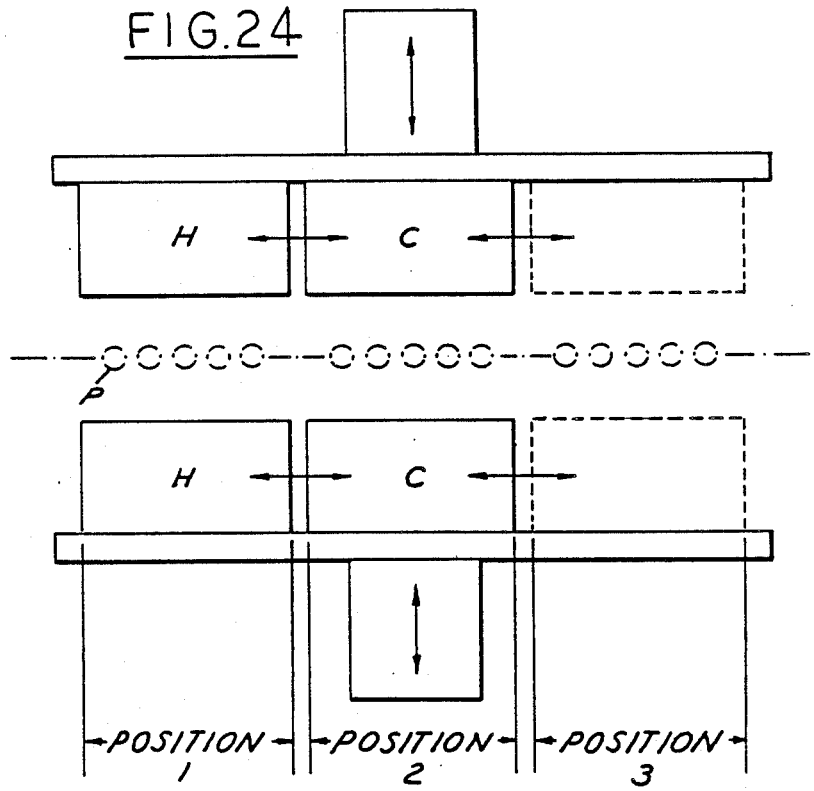
FIG. 24 is a schematic of the method embodying the invention.

Referring to FIG. 24, which is a schematic view, basically the method of making partially crystalline, biaxially oriented heat hollow plastic containers comprises:

1. Engaging the open end of hollow plastic parisons P of crystallizable material which are at a temperature within their molecular orientation temperature range.

2. Enclosing a hot mold H about the parisons at a first position, the mold H being at heat setting temperature.

3. Simultaneously enclosing a cold mold C at a second position about a previously blown containers in the hot mold to cool previously blown containers.

4. Expanding the plastic parisons within the hot mold by internal pressurization through the open end to induce biaxial orientation of the plastic parison and force the plastic parison into intimate contact and conformance with the hot mold and to maintain contact by such internal pressurization between the mold and biaxially oriented container for a time sufficient to induce partial crystallization in the biaxially oriented containers.

5. Moving the hot mold H and the cold mold C in unison to bring the hot mold to the second position and the cold mold to a third position, shown in broken lines, during the expanding of the parisons within the hot mold H and during the cooling of the previously blown containers in the cold mold C.

6. Maintaining a lower internal pressurization of the container in the hot mold H and exhausting the pressurization to atmospheric pressure in the cold mold C.

7. Substantially simultaneously opening the hot mold H and cold mold C.

8. Moving the open hot mold H and cold mold C to bring the hot mold H to the first position and open cold mold C to the second position.

9. Enclosing the hot mold H about second set of plastic parisons which are at a temperature within its molecular orientation temperature range.

10. Enclosing the cold mold C about previously blown containers from the first parisons.

11. Moving the blown and heat set containers to a succeeding position when they are removed.

Figure 1:
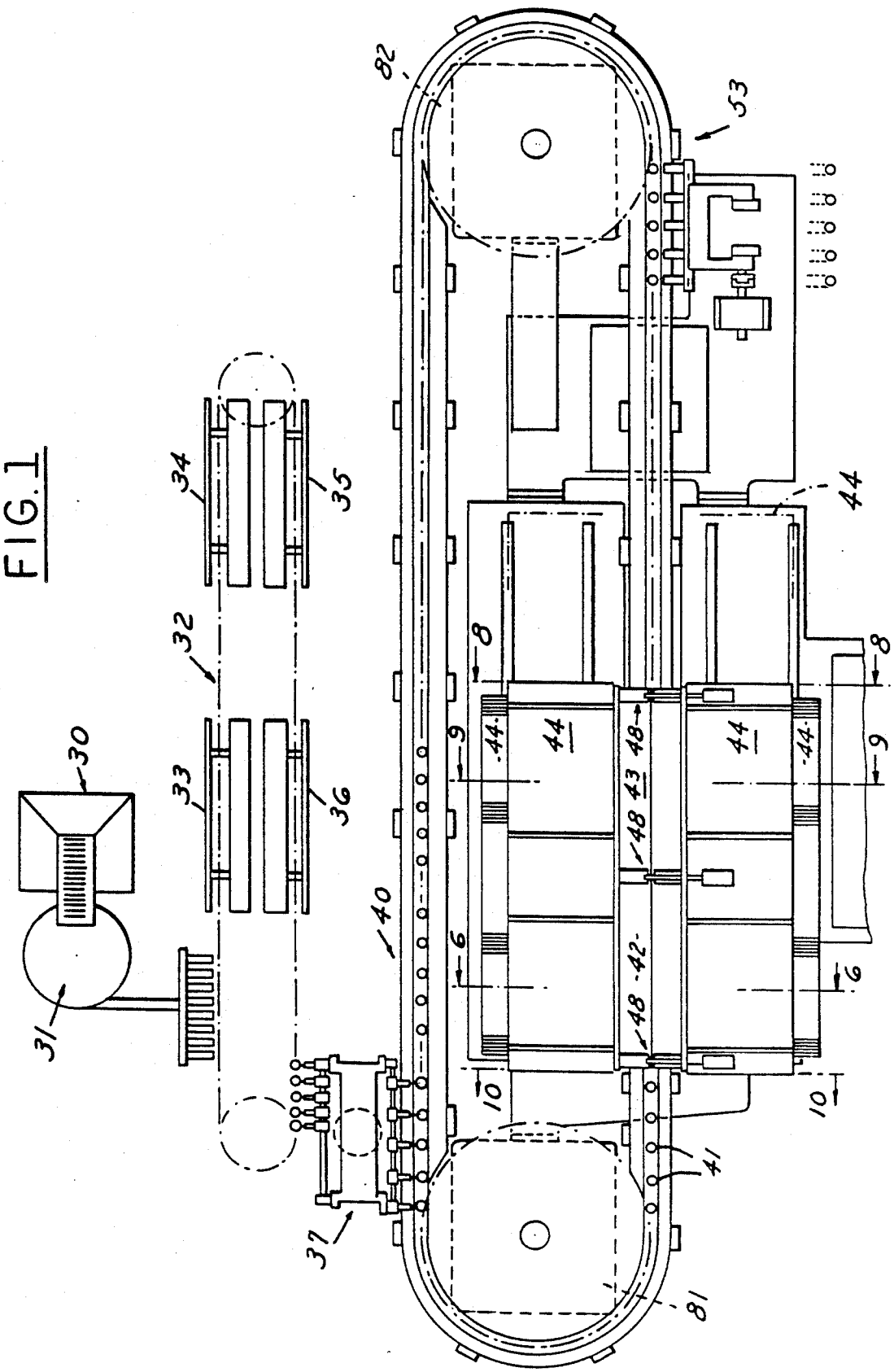
FIG. 1 is a partly diagramatic plan view of an apparatus embodying the invention.
Figure 2:
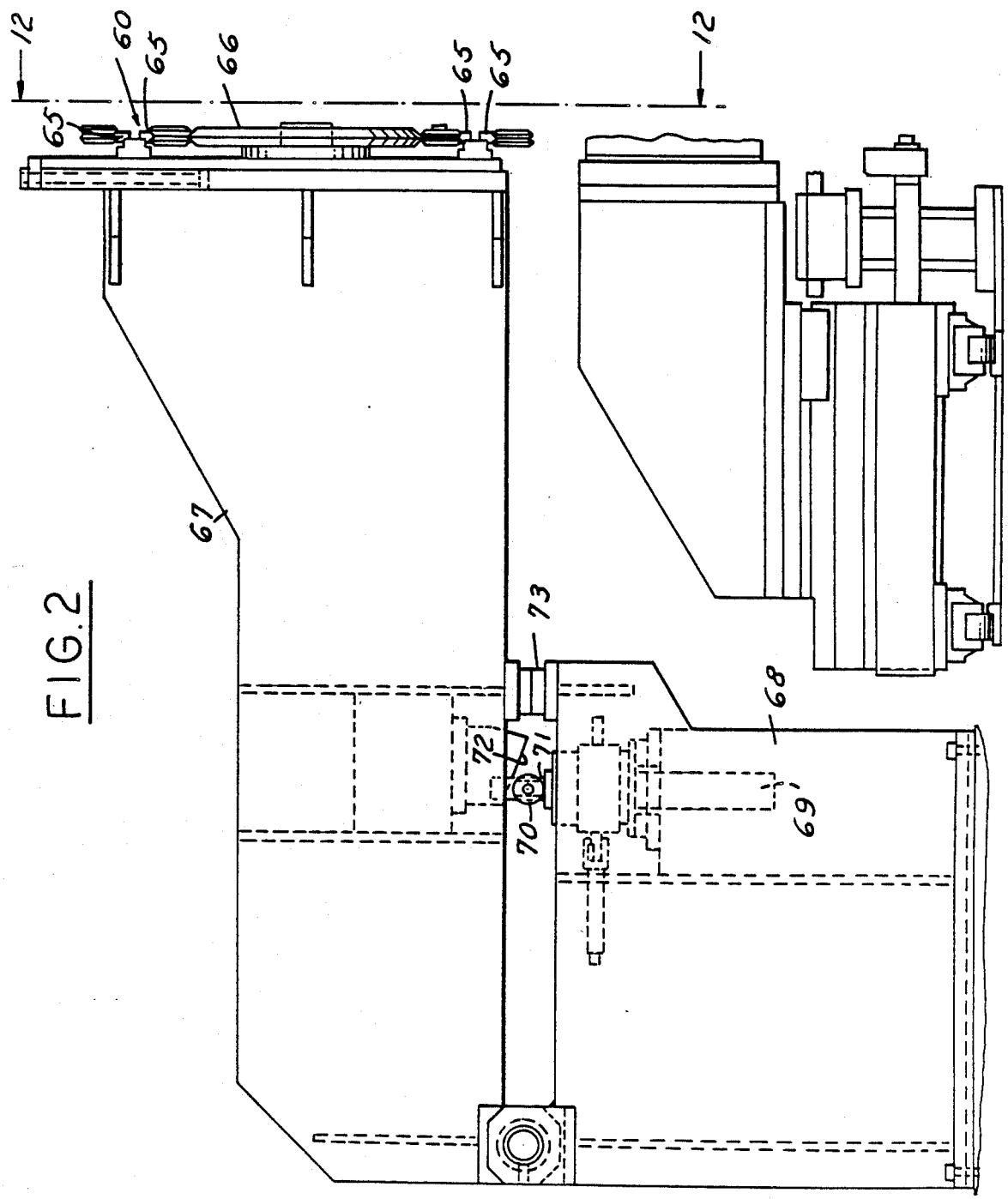
FIG. 2 is a fragmentary end view of a modified form of apparatus taken from the right as viewed in FIG. 1.

Referring to FIG. 1, an apparatus for performing the method comprises a hopper 30 from which plastic parisons or preforms are delivered to an orienter and sorter 31 that delivers the parisons to an intermittently driven conveyor 32 that has closely spaced mandrels which support the parisons in closely spaced relationship with the closed end up and the open end down. Conveyor 32 moves the parisons successively through a series of spaced heaters 33, 34, 35, 36 to a device 37 that changes the spacing between the parisons and deposits the heated parisons onto endless conveyor 40 that is supported, as presently described, for movement in a horizontal plane. Device 37 grasps a series of parisons corresponding in number to the number of containers in the mold sections.

The use of successive heaters permits equilibration of the temperature of the heating of the parisons between successive heaters resulting in more uniform temperature of the parisons. The conveyor 32 is indexed intermittently, preferably such that the number of parisons indexed to each heater and device 37 are the same as the number of cavities in the hot mold sections 42 and cold mold sections 43.

Endless conveyor 40 supports the heated parisons in predetermined spacing on mandrels 41 with the closed end up and the open end down. Partible plural cavity hot mold sections 42 and plural cavity cold mold sections 43 are mounted along the path of the conveyor 40 and are supported on platens 44 which are movable transversely on tracks 45 on a sub-base 46 by cylinders 47 (FIG. 10) for movement toward and away from one another to close and open the hot mold sections 42 and cold mold sections 43. Latching devices 48 are provided to lock the mold sections 42, 43 in closed positions. The sub-base 46 has rollers 50 that engage longitudinally extending tracks 51 on a base 52 for movement between a position shown in solid lines in FIG. 1 and a position shown in broken lines in FIG. 1 toward the right by a reciprocating mechanism. The mold sections are moved at a predetermined rate to the right as viewed in FIG. 1 and are returned at a more rapid rate to the left. Finally, the apparatus includes a take-out mechanism 53.

The hot mold sections 42 are at heat setting temperatures for the particular plastic such that when the hot mold sections 42 close over a plurality of heated parisons and internal pressurization is provided to expand the plastic parison, biaxial orientation is induced and the plastic parisons are forced into intimate contact and conformance with the hot mold and maintained in contact by such internal pressurization for a time sufficient to induce partial crystallization in the biaxially oriented containers.

The cold mold sections 43 are maintained at a cold temperature sufficient to cool the previously blown containers about which the cold mold sections 43 are closed.

In accordance with the invention, the method calls for moving the hot mold sections 42 and the cold mold sections 43 during the expanding of the parisons within the hot mold and during the cooling of a previously formed and blown containers within the cold mold. More specifically, the hot mold sections 42 are moved to a second position, previously occupied by the cold mold sections 43, and the cold mold sections 43 are moved to a third position. The pressure in the blown containers is then reduced. The hot mold sections 42 and cold mold sections 43 are then opened and rapidly returned in unison to the first position and second position, respectively. As previously described, when the mold sections 42, 43 close about mandrels 41, and are moved to the second position and third position respectively, the mandrels 41 and conveyor are moved by the closed mold sections 42, 43.

Where the method utilizes mold sections that include a separate mold base, as in the aforementioned application Ser. No. 021,894, the apparatus further includes an endless conveyor 60 that supports mold bases 61 in an endless vertical plane (FIGS. 2, 13-15). The mold sections 42, 43 close about the bases 51 and the longitudinal movement of the mold sections 42, 43 carries the bases 61 and, in turn, drives the conveyor 60 between the first and second stations. When the mold sections 42, 43 are opened at the second station and returned to the first station in open condition, the conveyor 40 and the mandrel assemblies remain stationary. In successive movements of the conveyor, the blown and heat set containers are moved to a third position and successive positions and are removed from the conveyor 60 by take-out mechanism 53.

As shown in FIGS. 2 and 13-15, conveyor 60 comprises roller supports 63 interconnected by links 64 and engaging spaced tracks 65 and curved end tracks 66. Tracks 65, 66 are mounted on a frame 67 pivoted to a conveyor base 68. When conveyor 60 is moved by the closed mold sections 42, 43 it positions the succeeding mold bases 61 in position for subsequent engagement by the open hot mold sections 42 when the hot mold sections 42 are returned to the first position without any need for devices to move the bases 61 axially inwardly relative to the molds. A cylinder 69 on base 68 is provided for bringing a roller 70 on the shaft 71 of the cylinder 69 into engagement with an inclined cam 72 on frame 67 to lift the conveyor 60 out of engagement with pads 73 and out of operative position in order to move the bases out of operative position so that mold sections with integral bases can be used or to provide access for maintenance.

Figure 5:
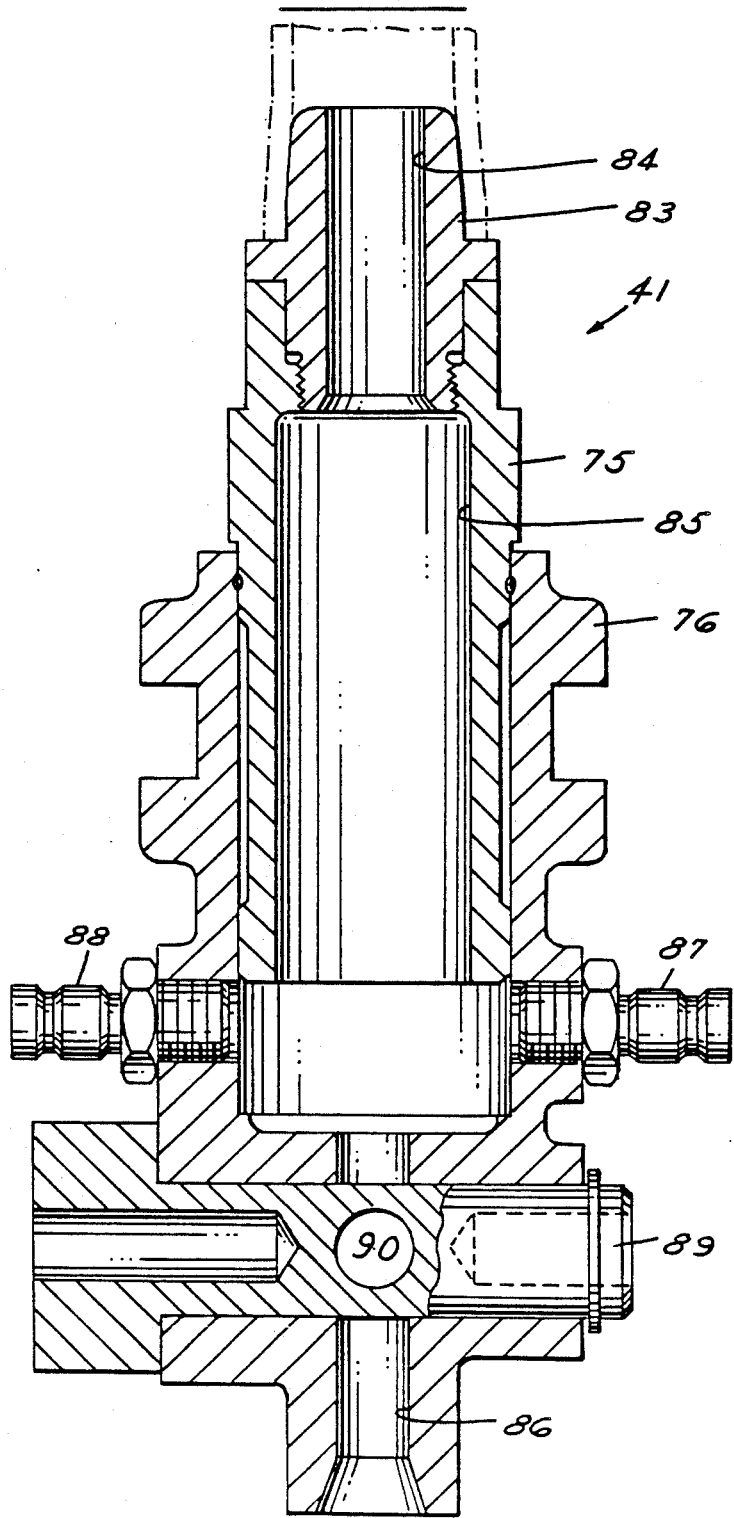
FIG. 5 is a vertical sectional view on an enlarged scale taken along the line 5—5 in FIG. 3.

Referring to FIGS. 3 and 5, each mandrel assembly 41 includes a mandrel 75 which is adapted to support a parison in inverted position with the closed end up and the open end down. The mandrel assemblies 41 are interconnected by a mandrel body 76 fixed on mandrel 75 links 77 in each group of assemblies corresponding to the number of cavities in the respective hot mold and cold mold. A connecting roller link assembly 78 is provided between adjacent groups of mandrel assemblies 41 and comprises links 79, 80 that rotably support spaced rollers 80. The entire assembly is rotably mounted on sprockets 81, 82 that are mounted for rotation on vertical axes.

As shown in FIG. 5, each mandrel assembly 41 has a mandrel tip 83 threaded in the upper end of each mandrel 75. The tip 83 and mandrel 75 have aligned openings 84, 85, and mandrel body 76 has an opening 86 for passage of a stretch rod, as presently described. Quick disconnect blow valve 87 and transfer valve 88 are provided along the sides of the body 76 for engagement with sources of blow air and transfer air to spaces 85, 84. A rotary valve 89 is rotably mounted in the lower end of the body 76 and has an opening 90 which can be brought into alignment with the passage 86 for insertion of a stretch rod 91. The valve 89 is what is commonly known as a quarter turn valve and includes a cam follower 92 that is adapted to be engaged by a cam track 93, as presently described, to rotate the array of valves 89 and open and close communication between the opening 86 and the opening 85 of each mandrel assembly 41. A spring-loaded detent 94 holds each valve 89 in closed position.

Figure 6:
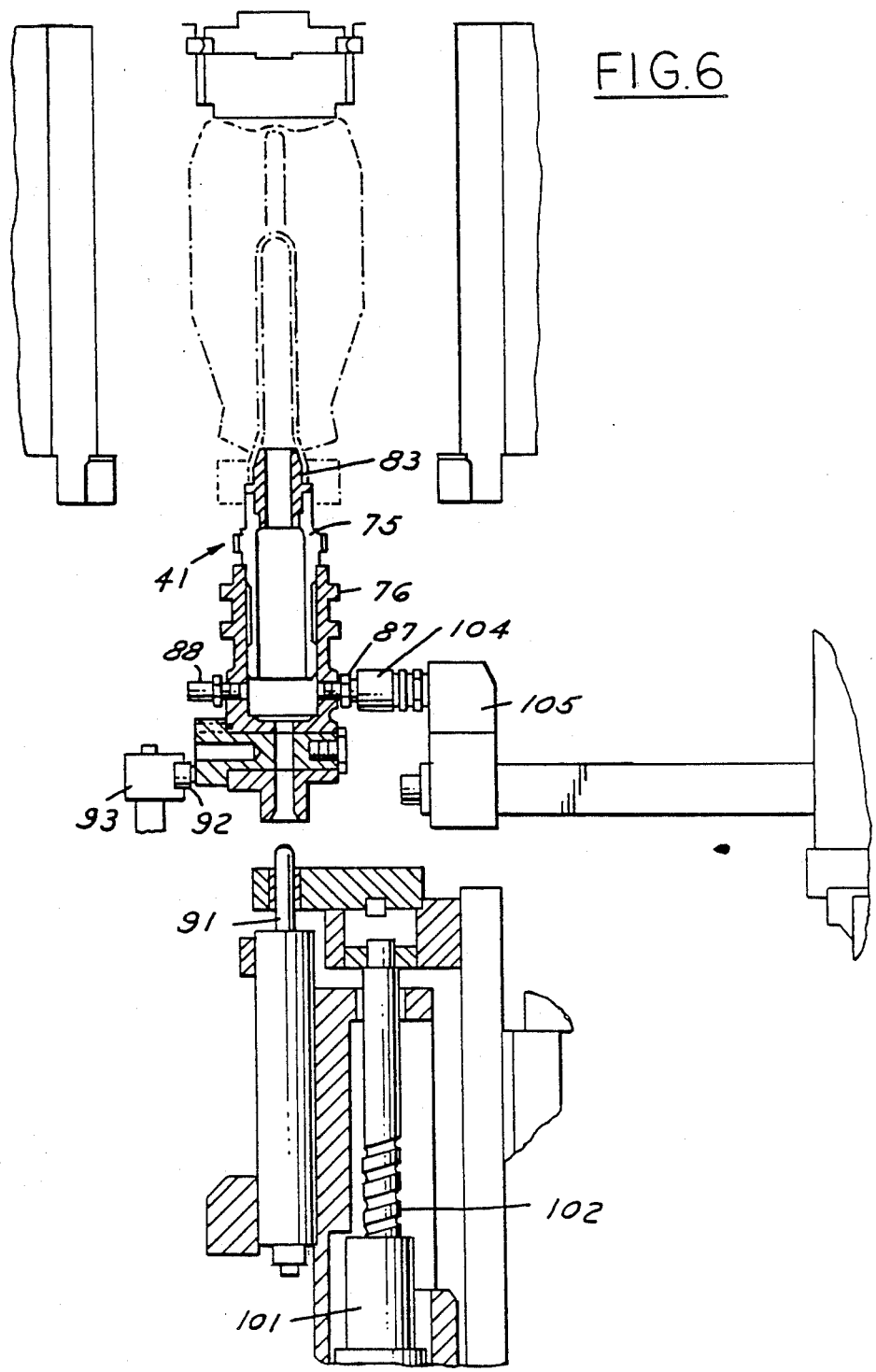
FIG. 6 is a fragmentary sectional view on an enlarged scale taken along the line 6—6 in FIG. 1. parts being broken away.
Figure 7:
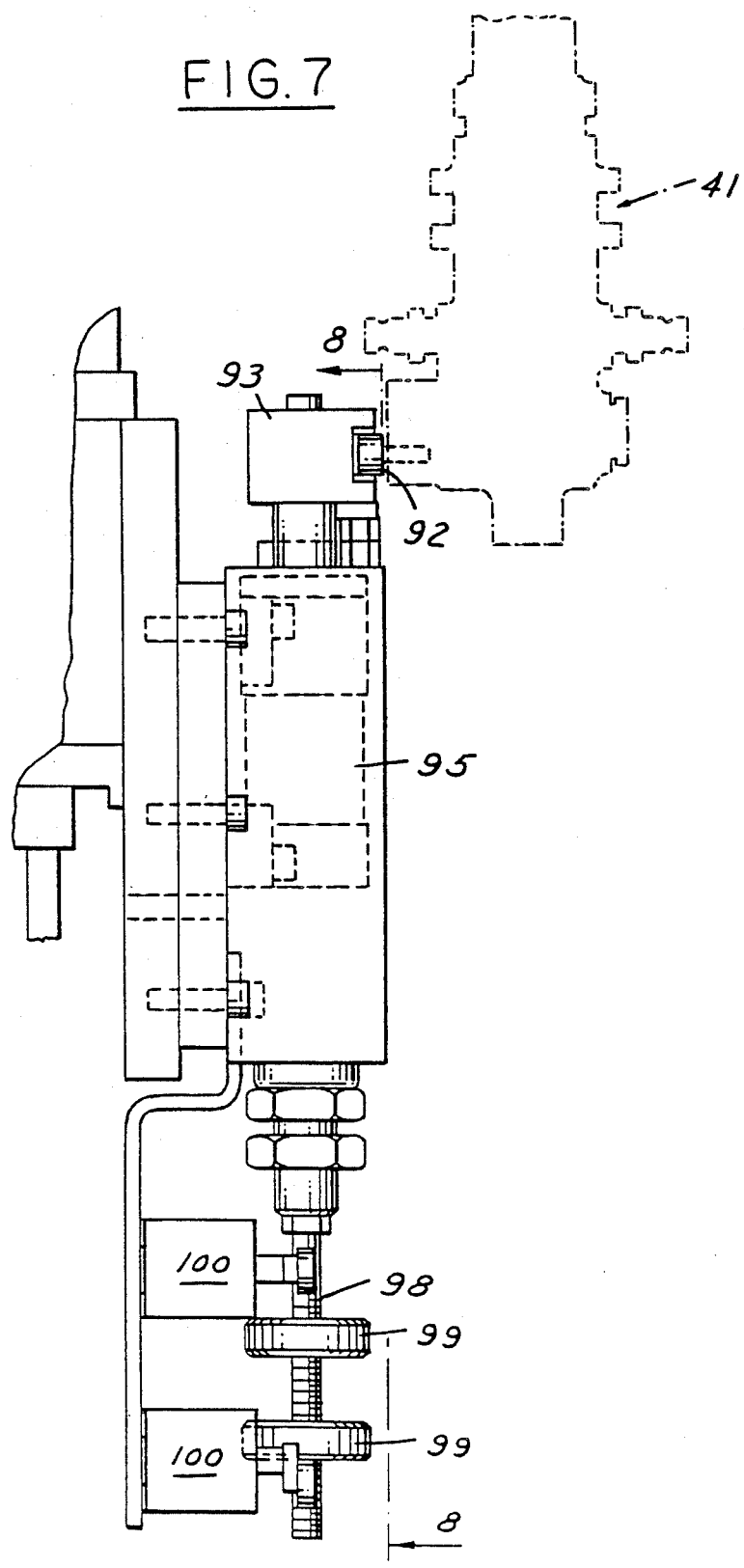
FIG. 7 is a fragmentary sectional view taken along the line 7—7 in FIG. 8.
Figure 8:
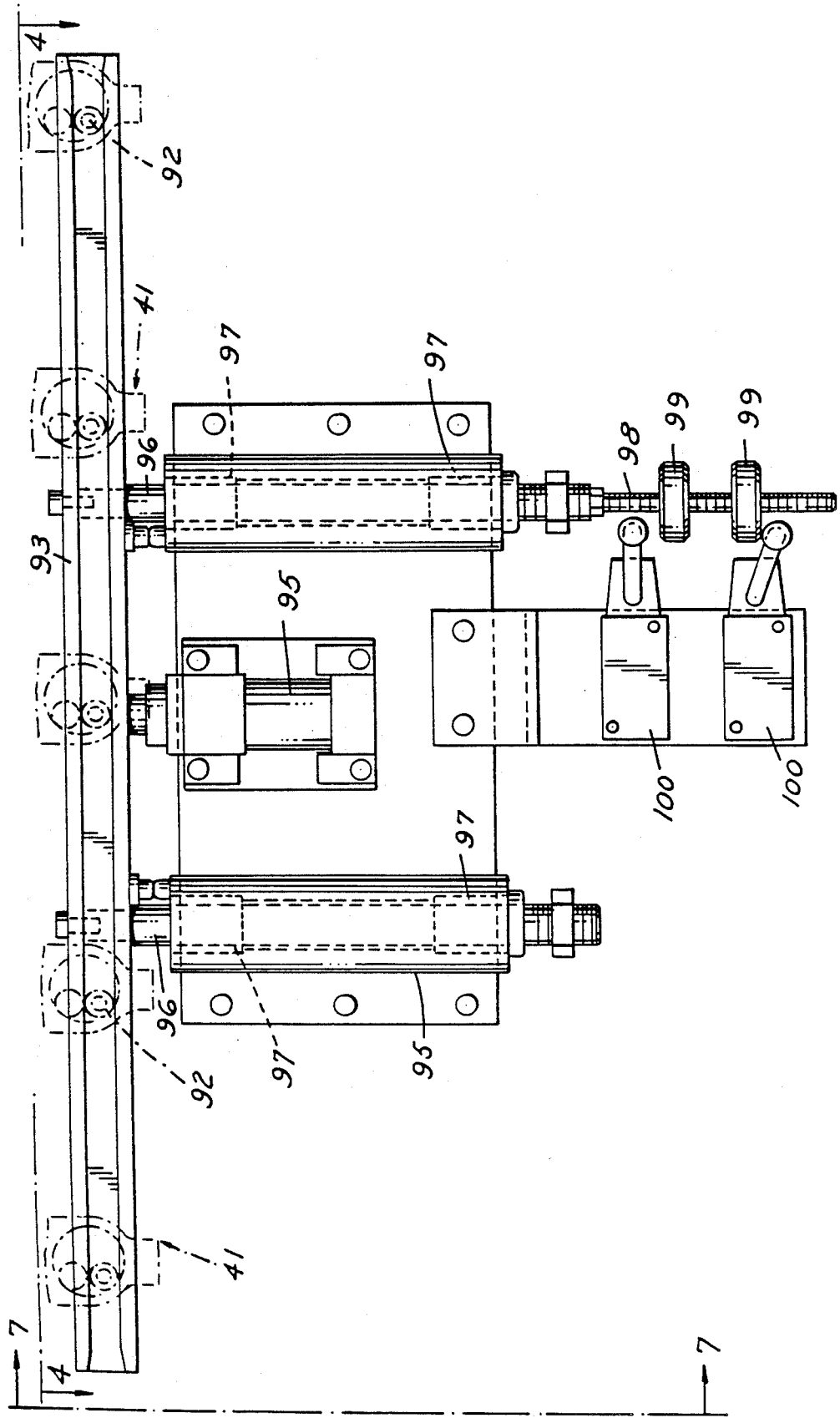
FIG. 8 is a fragmentary elevational view taken along the line 8—8 in FIG. 7.

Referring to FIGS. 4-7, the quarter turn valves 89 are opened and closed when the hot mold sections are at the first station and the cam followers 92 re engaged by cam track 93. The cam track 93 is movable vertically by a cylinder 95 (FIG. 7). As the array of mandrels 41 move into position adjacent the multiple cavities of the hot mold sections 42, cam followers 92 engage the cam track 93. Cylinder 95 is then actuated to move the cam followers 92 downwardly opening the quarter turn valves 89 in order to permit insertion of stretch rods 91 into the mandrel assemblies 41 and, in turn, the parisons P. As shown in FIG. 8, cam track 93 is supported for vertical movement by spaced guide rods 96 supported in bearings 97. One of the rods 96 has a threaded shaft 98 on which adjustable actuators 99 ar provided for actuating limit switches 100 to control the extent of movement of the track 93.

Referring to FIG. 6, a stretch rod apparatus is provided at the first position of hot mold sections 42 for moving a stretch rod 91 upwardly to stretch each parison at the beginning of the blow cycle. The apparatus comprises a ball nut 101 engaging a screw 102 that is rotated to translate the nut 101 which, in turn, supports the stretch rod 91 vertically into and out of the mandrel body 76 and the plastic parison while the hot mold is stationary at the first station. A stretch rod apparatus is provided for each mandrel assembly 41 and the stretch rods 91 are operated simultaneously to stretch the parisons and then are retracted, after which the cam track 93 is moved upwardly to close the valves 89.

Where a stretch rod is used, the stretch rod is moved from a first lower position to a second position closing the opening 36 before the valve 89 is opened. After the valve 89 is opened, the stretch rod is moved upwardly to a third position to stretch the parison.

An array of blow connecter valves 104 are provided for movement into engagement with the blow valves 87 of the hot mold sections 42 and another similar array are provided with movement with the cold mold sections 43. Blow connector valves 104 are mounted on a bar 105 and are movable by a cylinder 105a into and out of engagement with the blow connector valves 87 on the mandrel assemblies 41 about which the mold sections are closed. Controls are shown preferably supply blowing fluid such as air initially at a low pressure and subsequently at a higher pressure by a three position valve as is well known in the art.

Figure 9:
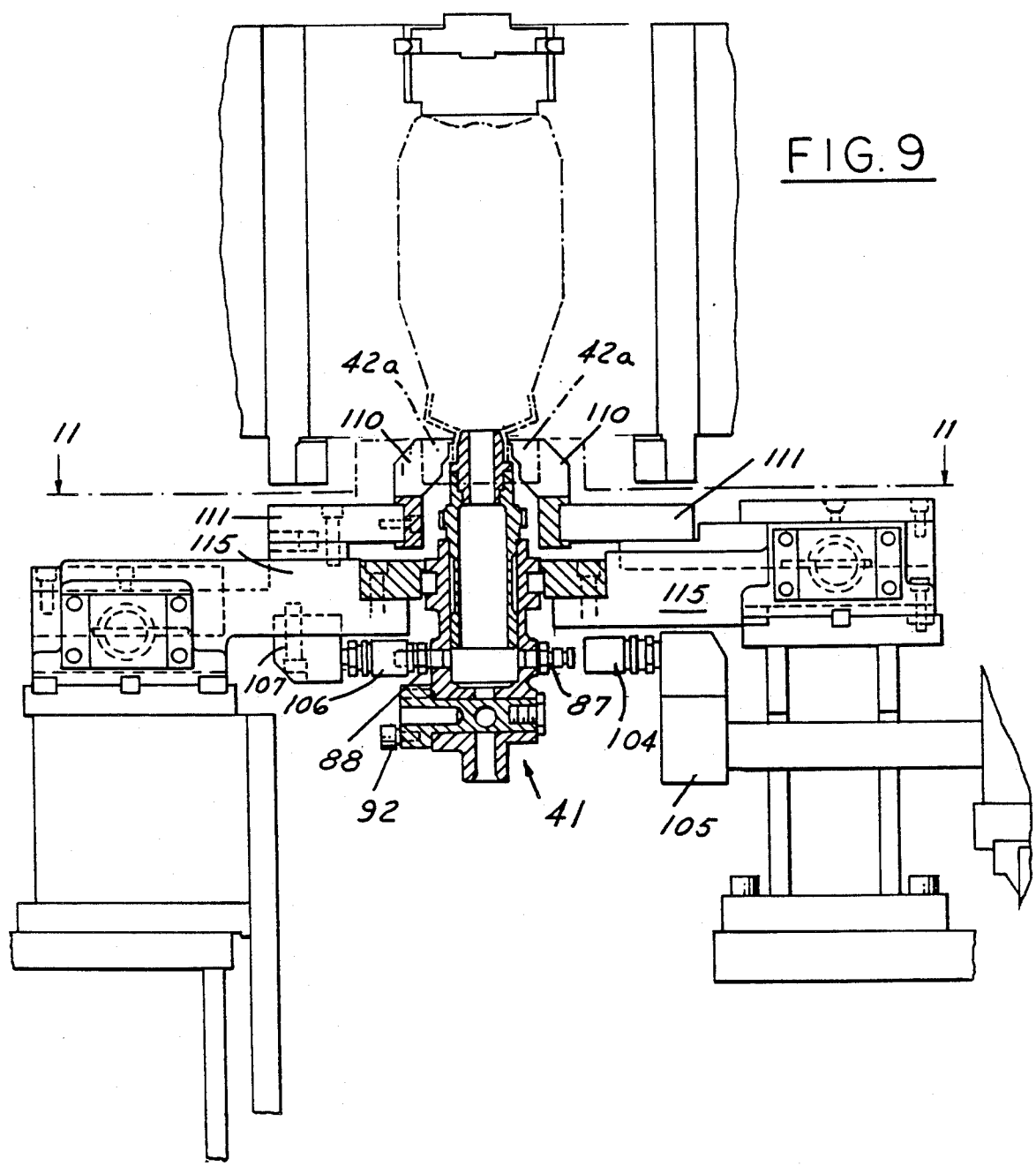
FIG. 9 is a fragmentary sectional view taken along the line 9—9 in FIG. 1, parts being broken away.

Referring to FIG. 9, an array of transfer connecter valves 106 are provided at the second station and moved transversely toward and away from the mandrel assemblies 41 for engaging the transfer valves 88 to open the transfer valves 88. Transfer connector valves 106 are mounted on a bar 107 for movement transversely for engagement with the transfer valves 88 of mandrel assemblies 41 associated with the hot mold at the second station before the hot mold is opened so that when the hot mold is opened, a lower transfer pressure is applied to the blown containers. After the hot mold is moved to the first station and the cold mold is moved to the second station, the cold mold is closed about the hot previously blown containers, and the pressure inside the containers is increased from the transfer pressure, on the order of 1–30 PSI, to the blow pressure, on the order of 200–350 PSI, so that the containers are in intimate contact with the cold mold. Blow connector valves 104 are adapted to be moved into engagement with the blow valves to open blow valves at the first station. The blow connector valves 104 remain in engagement with the blow valves 86 throughout the movement of the hot molds from the first position to the second position.

Figure 12:
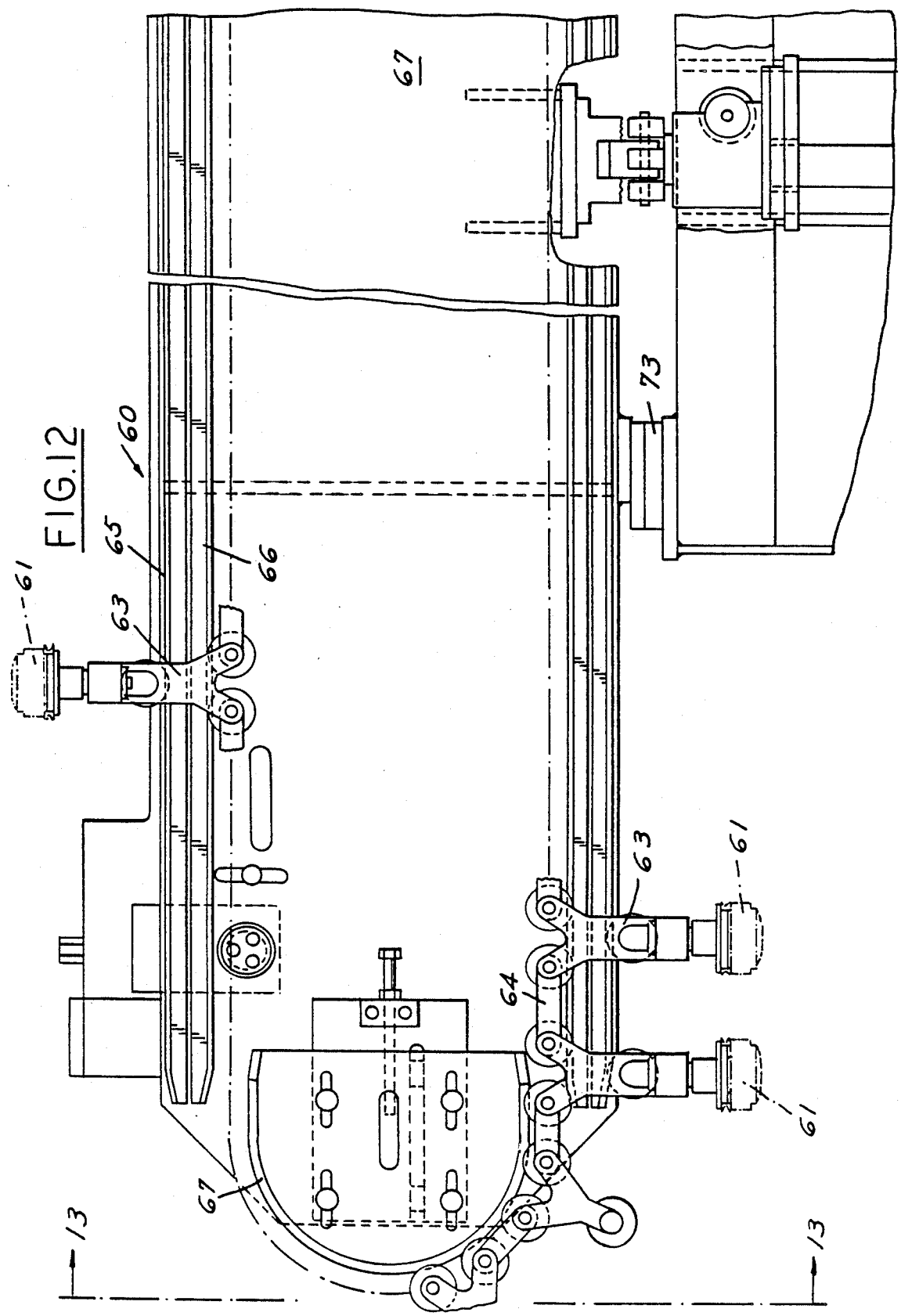
FIG. 12 is a fragmentary elevational view of a portion of the apparatus shown in FIG. 2 taken along the line 12—12 in FIG. 2.
Figure 15:
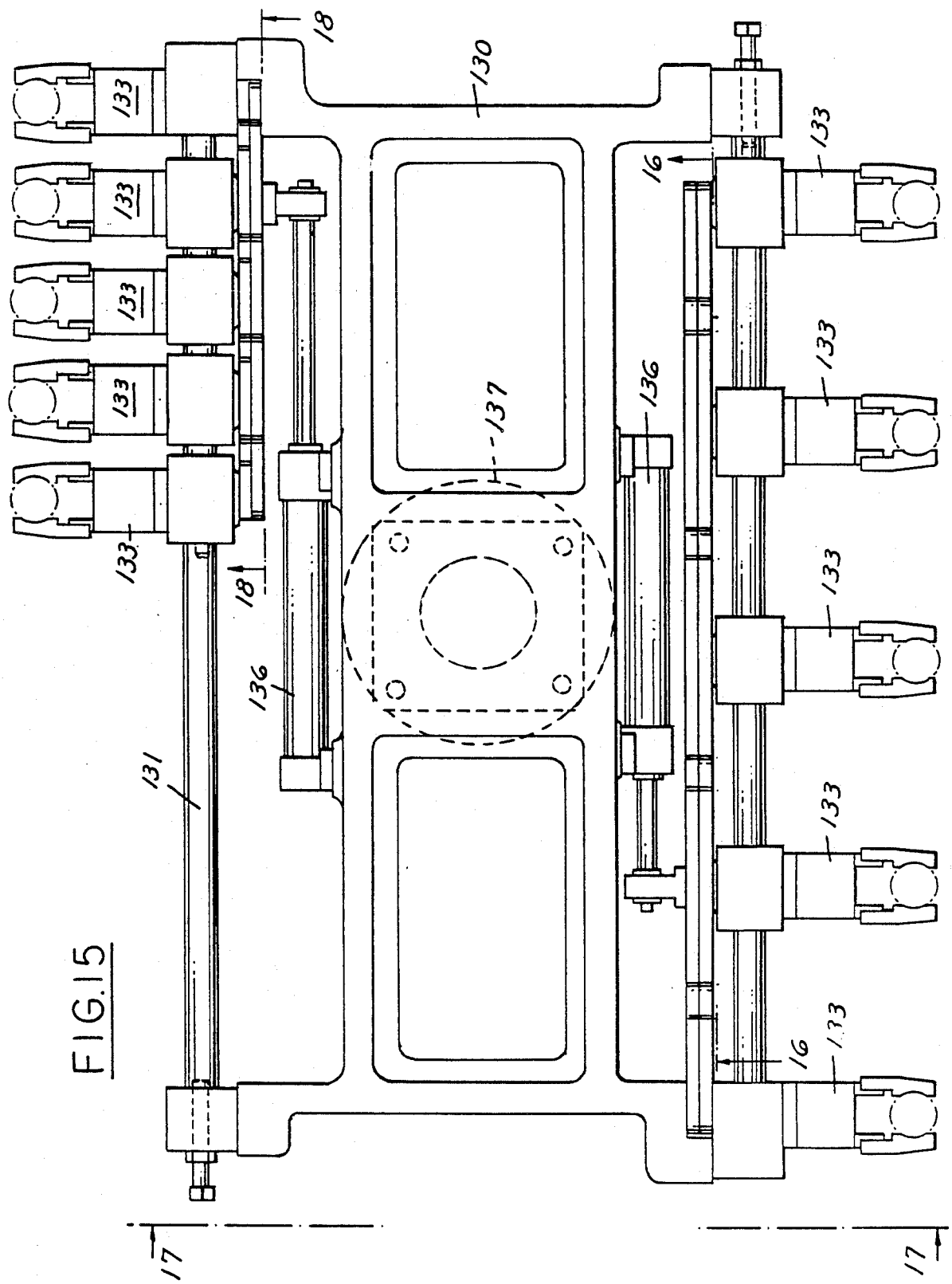
FIG. 15 is a fragmentary plan view on an enlarged scale of another portion of the apparatus shown in FIG. 1.
Figure 18:
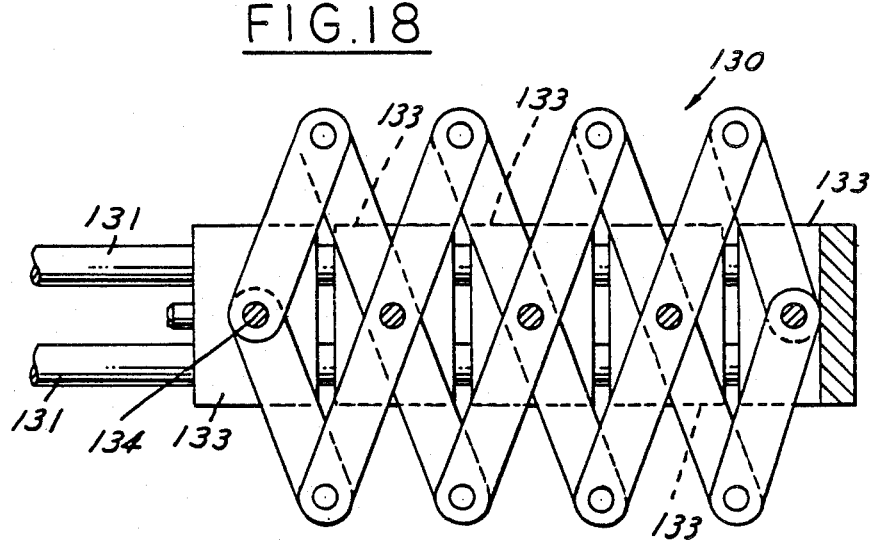
FIG. 18 is a fragmentary sectional view taken along the line 18—18 in FIG. 15.
Figure 19:
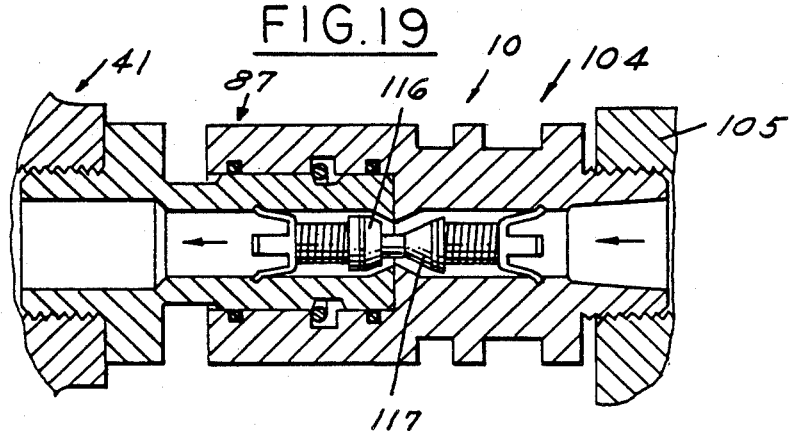
FIG. 19 is a longitudinal sectional view through valves utilized in the apparatus.

Referring to FIGS. 9 and 12, provision is made for holding the containers when the mold sections are opened and comprises keepers 110 comprising elongated plates having a configuration for engagement with the neck of the blown container and mounted for movement in slots or neck rings 42a of the mold sections 42, 43 transversely radially toward and away from the open end or neck of the container as s own in broken lines in the upper end of FIG. 9. The keepers 110 are mounted on longitudinally extending bars 111 which are movable transversely by cylinders 112 that cause a cam follower 113 to track in an inclined slot 114 so that by reciprocation of the cylinders 112, the bars 111 and, in turn, the keepers 110 are moved transversely inwardly and outwardly for engaging the blown containers. The keepers 111 are positioned only at the second station and are engaged with the blown containers prior to the opening of the hot mold to hold the previously blown containers in position until the cold mold is closed about the previously blown hot containers. As shown in FIG. 9, the bar 111 on one side supporting keepers 110 and the oar 107 supporting the transfer connector valves 106 are mounted on a common intermediate body 115 s that the keepers 110 and transfer connector valves 106 are engaged at the same time prior to the opening of the hot mold at the second station.

Figure 20:
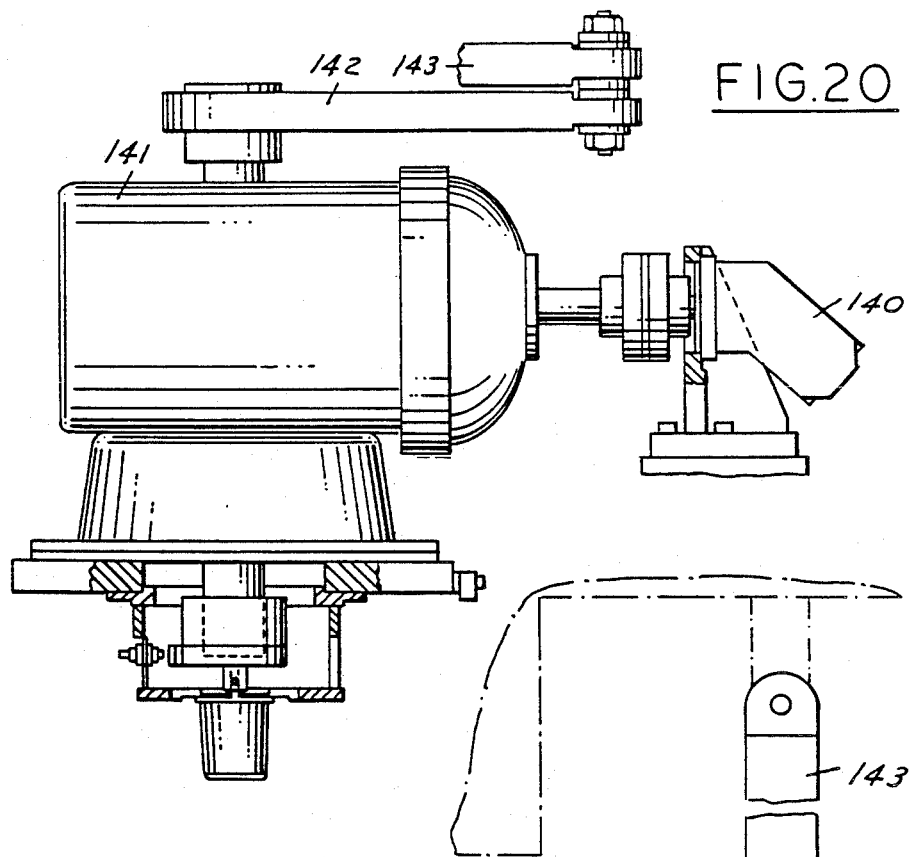
FIG. 20 is a fragmentary part sectional elevational view of a drive system utilized in the apparatus.
Figure 21:
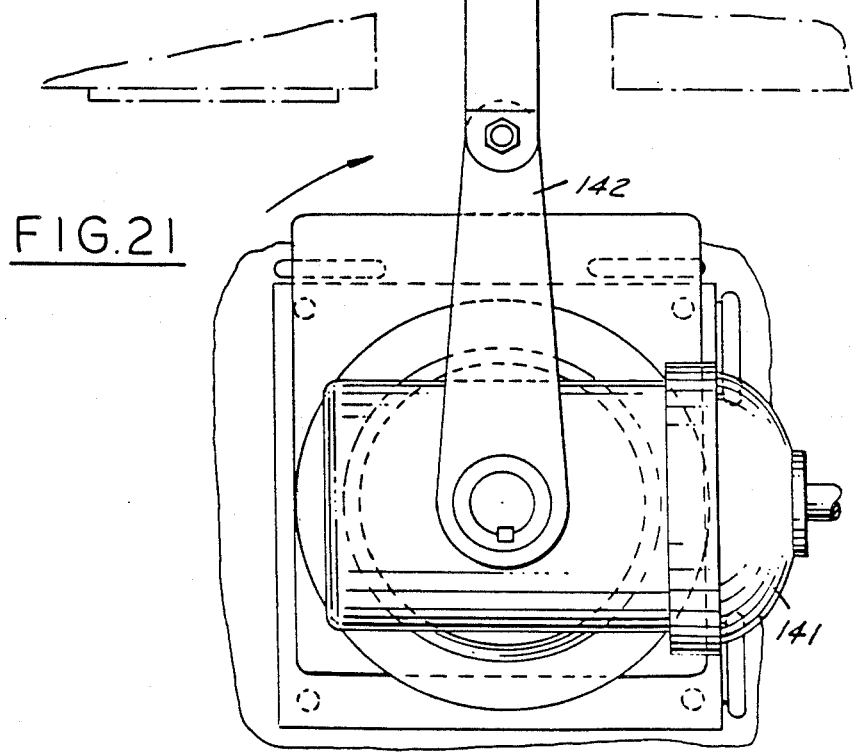
FIG. 21 is a fragmentary plan view of the drive system shown in FIG. 20.

FIG. 20 is a transverse section of a typical quick disconnect valve arrangement utilized for the valves 87, 88 and 104, 106. The construction of such valves and connecter valves is well known, the valves 87, 88 including a normally closed spring loaded valve 116 that is opened by a member 117 when the connection is made between the valve 87, 88 and the connecters 104, 106. The engagement is what is known as a quick opening connection.

Figure 10B:
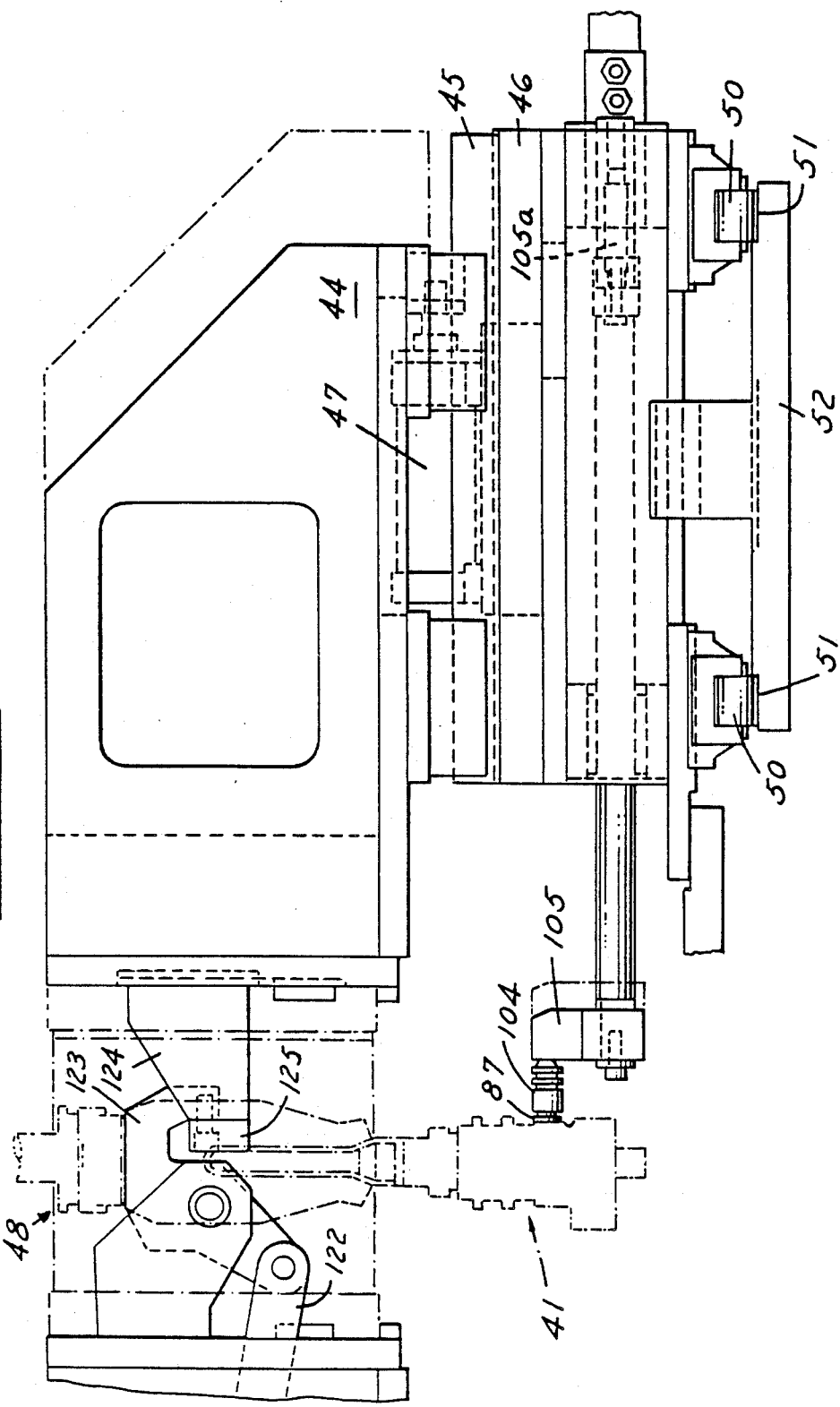
Figure 11:
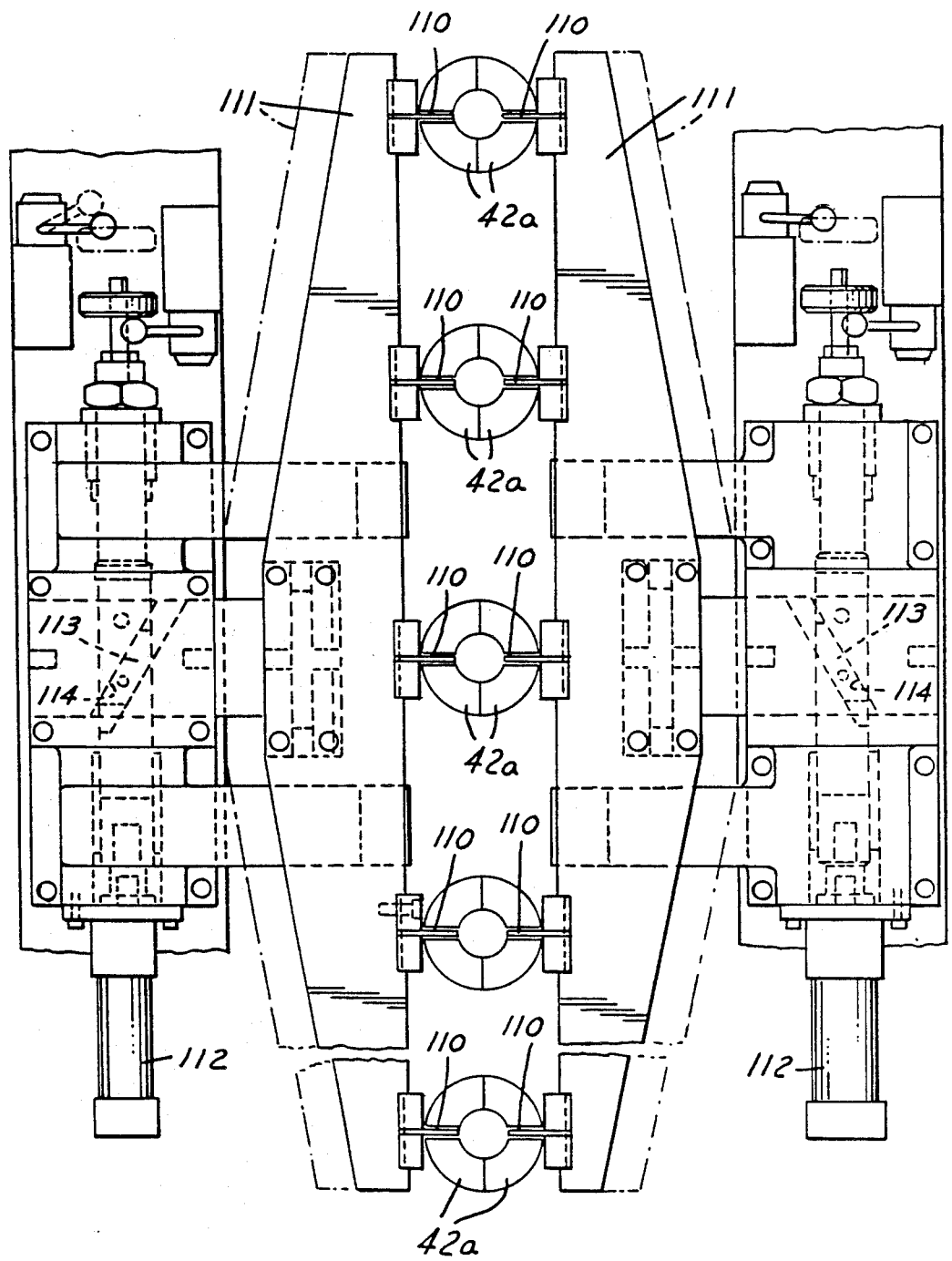
FIG. 11 is a fragmentary sectional plan view taken along the line 11—11 in FIG. 9.

Referring to FIGS. 10A and 10B, latching devices 48 for latching the mold sections in closed position comprise a piston 120 pivoted about a horizontal axis 121 on one of the platens 44 and having its shaft 122 connected to a hook 123 that is pivoted on a bracket 124 on the platen 44. The opposed platen 44 supports a complementary bar 125 defining a recess 126 for receiving the hook 123. By utilizing the latching devices 48, it is possible to provide high blow pressures without the need for large pneumatic or hydraulic cylinders for holding the mold halves together. Upon expansion of the parisons within the hot molds, the clamps effectively hold the mold sections together.

Referring to FIGS. 16–19, the apparatus for receiving the hot parisons from the heating conveyor and changing the spacing thereof comprises a frame 130 that includes spaced parison shaft 131. The shaft 131 supports pneumatically operated grippers 133 which are mounted at the pivot points 134 of arms of a parallelogram linkage 135. The linkages 135 are, in turn, connected to pneumatic motors 136. A cylinder 137 is provided for lifting and lowering body 130 the grippers 133 engage the heated parisons at close spacing, body 130 is lifted to remove parisons from the heating conveyor, cylinder 136 is actuated to change the spacing of grippers 133 to a greater spacing corresponding to that of the conveyor 40 by actuation of the cylinders 136 and the body 130 is then rotated and lowered to bring the heated parisons and deposit them on the mandrel assemblies 41. By having a lesser spacing between the parisons during heating, the heaters can be made shorter and substantial savings in energy can be achieved. In addition, by heating the parisons before placement on conveyor 40, the length of conveyor 40 is reduced.

Figure 22:
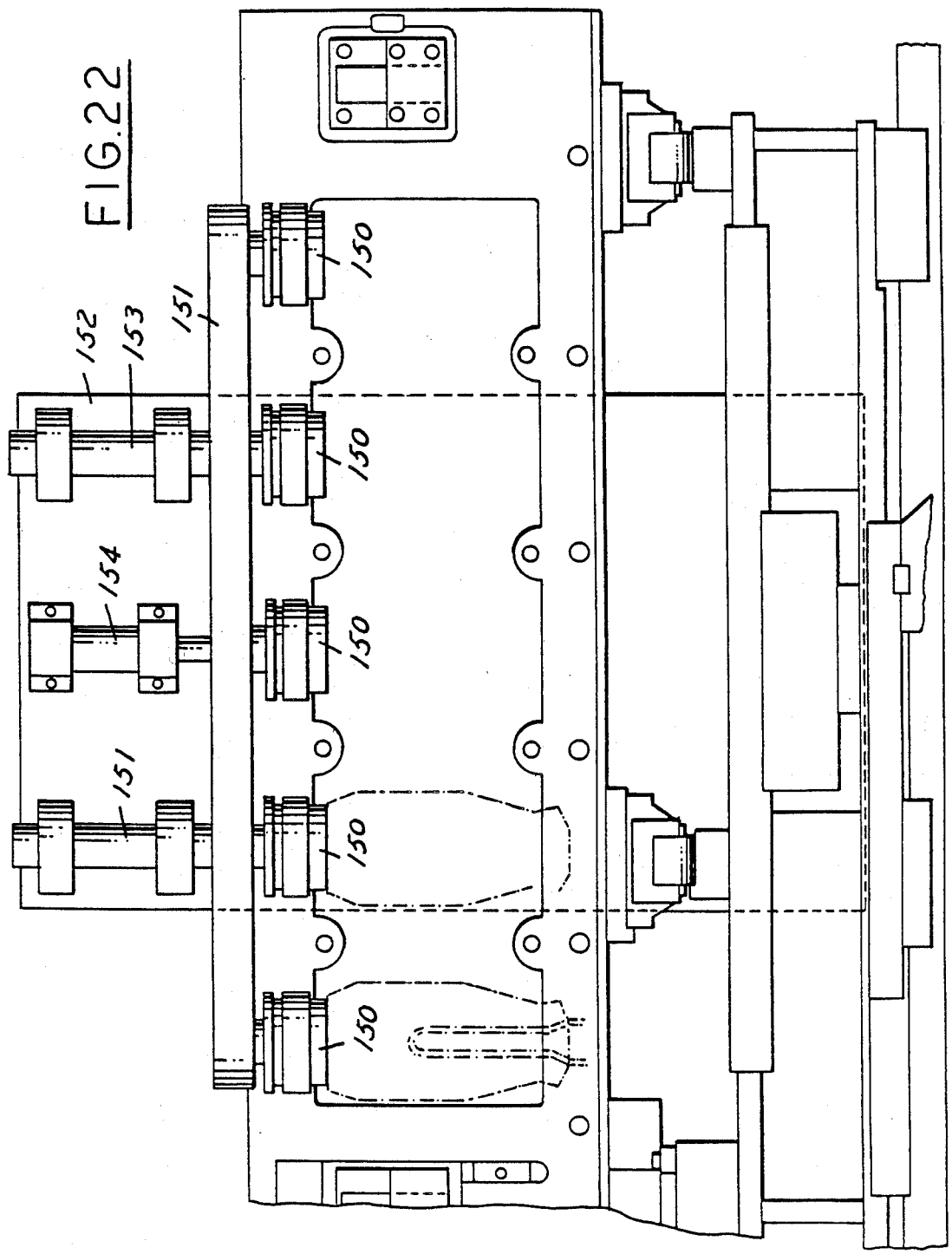
FIG. 22 is a fragmentary end elevational view of a modified form of the apparatus.
Figure 23:
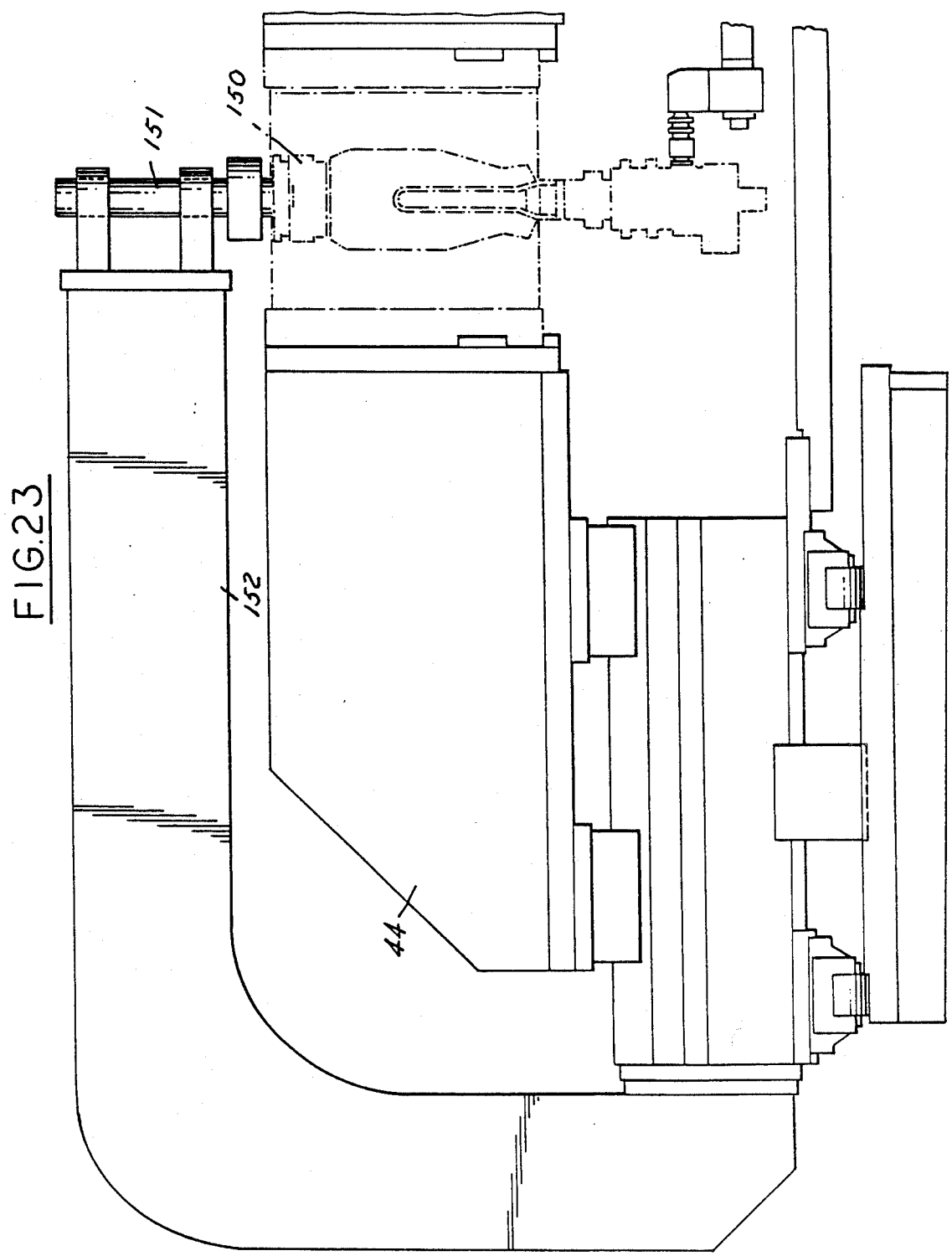
FIG. 23 is a fragmentary side elevational view of a portion of the apparatus shown in FIG. 22.

Referring to FIGS. 22 and 23, the drive for moving the hot mold sections and cold mold sections longitudinally back and forth in a reciprocating action comprises a hydraulic motor 140 which drives gearing 141 to rotate a crank 142 and move a link 143 that is connected to sub base 46.

The operation of the apparatus described above in performing the method may be summarized as follows:

1. Parisons P are delivered from hopper 30 to an orienter and sorter 31 in groups to conveyor 32.
2. Conveyor 32 supports the parisons with the closed end up and the open end down and moves them successively through a series of spaced heaters 33, 34, 35. 36 to a device 37.
3. The device 37 changes the spacing between the parisons and deposits the heated parisons onto the endless conveyor 40 in groups or arrays corresponding to the number of cavities in the hot mold and cold mold.
4. The mandrels 41 onto which the parisons have been delivered are moved intermittently by the closing of the mold sections 42 and mold section 43 and movement thereof longitudinally.
5. The hot mold sections 42 are closed about the hot parisons and the cold mold sections 43 are closed about previously blown hot containers and the latching devices are locked.
6. Simultaneously with the closing of the mold sections, the blow connector valves 104 are engaged with the blow valves 87.

7. If stretch rods are to be used, the quarter valve 89 are opened by movement of the cam track 93 downwardly and the stretch rods 91 are moved through the mandrel assemblies 41 to stretch the parisons and are then retracted and the valves 89 are closed by moving the track 93 downwardly.

8. The drive mechanism then moves the hot mold sections 42 to the second position and the cold mold sections 43 to the third station while blow air is being applied to blow the parisons against the confines of the hot mold and while the previously blown containers are being quenched in the cold mold sections.

9. The keepers 110 and transfer connector valves 106 are engaged with the transfer valves of the blown containers at the second station before the mold sections are opened.

10. The hot mold sections 42 and cold mold sections are opened.

11. The open hot mold sections and open cold mold sections are returned to the first position and second position respectively.

12. The hot mold sections and cold mold sections are closed respectively about another set of hot parisons and previously blown hot containers and the cycle is begun once again.

13. Upon subsequent movements of the closed hot and cold mold sections in successive cycles, the previously blown and quenched containers are moved by the conveyor 40 to a fourth position.

14. The blown and quenched containers are removed by the take-out mechanism 53.

Figure 25:
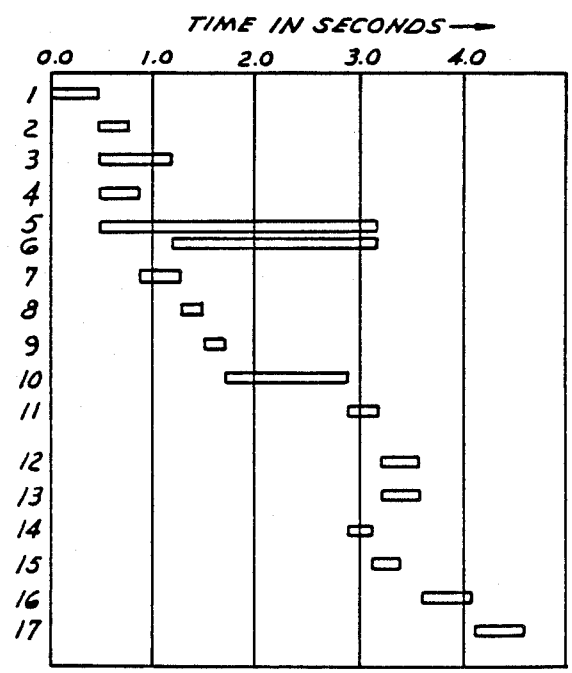
FIG. 25 is a cycle time chart.

Referring to FIG. 25, in a typical time cycle for blowing 2 liter polyethylene terephthalate containers, the successive time and machine movements are:

1. Molds close and blow air connect.
2. Finger in and transfer air disconnect.
3. Low pressure in hot mold.
4. Stretch rod to position 3.
5. Blow cycle cold mold.
6. High pressure on hot mold.
7. Stretch rod down to position 2.
8. ¼ turn valve close position 1.
9. Stretch rod down position 2.
10. Molds index to position 2 and 3.
11. Finger out and transfer air connected (position 2).
12. Exhaust to transfer pressure in hot mold.
13. Exhaust to atmospheric pressure in cold mold.
14. ¼ turn valve open.
15. Stretch rod to position 1.
16. Molds open (positions 2 and 3).
17. Molds return to positions 1 and 2.

Referring to FIG. 25, for the above example, for larger size containers such as 2-3 liters and the total blow time is 2.7 seconds which includes a blow time of 1.0 second and a heat setting time of 1.7 seconds. Overall cycle time is 4.6 seconds from the time the hot mold at position 1 and the cold mold at position 2 close about a first set of parisons and a first set of previously blown containers, respectively, until the hot mold and cold mold again close about a second set of parisons and a second set of blown containers, respectively.

The use of the stretch rod is optional. If the stretch rod is not needed, then mold index to positions 2 and 3 can take place immediately after the molds are closed and latched. Thus, mold index time to positions 2 and 3 can be as low as 0.5 seconds. The total blow time in the hot mold for smaller size container can be as low as 1.5 seconds. For smaller size containers, the overall cycle time can be reduced by 0.7 seconds to 3.9 seconds when the stretch rod is used. When the stretch rod is not used for smaller size containers, then both overall cycle time and the total blow time can be reduced by 1.2 seconds to 3.4 seconds and 1.5 seconds respectively.

In the prior heatsetting methods, the container is transferred externally under positive pressure from hot mold to cold mold. It is important that transfer time should be as low as possible to reduce the overall cycle time. At lower transfer time, the container would distort during the transfer step. In prior methods, the transfer time has to be at least 2.5 seconds to transfer the container about 35 inches without distortion. In the above example, this translates into the overall cycle time of 6.6 seconds.

Utilizing the method in accordance with the invention, the overall cycle time can be reduced as much as 30%-37%.

The heat set temperature parameters for the PET of the above example are shown in Table I.

It can be seen that by blowing during transfer substantial savings are made in cycle time, as compared to a method wherein the container is transferred externally where the container is subject to distortion.

Where the apparatus is to be utilized in performing the method of the aforementioned copending application Ser. No. 020,830, wherein the mold bases do not move with the hot molds and cold molds, the construction such as shown in FIGS. 24 and 25 may be used. In this form, mold bases 150 are mounted on a plate 151 which, in turn, is guided for vertical movement on a frame 152 by shafts 153. A cylinder 154 moves the plate 151 and bases 150 to and from a position between the hot mold sections 42. When the hot mold sections close and are moved to the second section, the movement of sub-base 46 moves the bases with the mold sections 42.

The method and apparatus can be adapted to the aforementioned method of U.S. Pat. No. 4,522,779 and the aforementioned patent applications Ser. Nos. 923,503, 021,894, 020,830 and 020,813 which are incorporated herein by reference.

The process of the present invention, as well as the product, is especially concerned with polymers of poly(ethylene) terephthalate having an inherent viscosity of at least 0.6. Poly(ethylene) terephthalate polymers useful in the present invention include repeating ethylene terephthalate units with the remainder being minor amounts of ester-forming components and copolymers of ethylene terephthalate wherein up to about 10 mole percent of the copolymer is prepared from the monomer units selected from butane-1,4-diol; diethylene glycol; propane-1,3-diol; poly tetramethylene glycol). poly ethylene glycol); poly(propylene glycol); 1,4-hydroxymethylcyclohexane and the like, substituted for the glycol moiety in the preparation of the copolymer, or isophthalic; naphrhalene 1,4- or 2,6-dicarboxylic; adipic; sebacic; decane-1,10-dicarboxylic acids, and the like, substituted for up to 10 mole percent of the acid moiety (terephthalic acid) in the preparation of the copolymer.

Of course, the poly(ethylene) terephthalate polymer can include various additives that do not adversely affect the polymer. For instance, some such additives are stabilizers, e.g., antioxidants or ultraviolet light screening agents, extrusion aids, additives designed to make the polymer more degradable or combustible, and dyes or pigments. Moreover, cross-linking or branching agents such as are disclosed in U.S. Pat. No. 4,188,357 can be included in small amounts in order to increase the melt strength of the poly(ethylene) terephthalate.

The process is also applicable to multilayer parisons comprising an orientable heat settable polymer and other polymers which provide desirable barrier properties wherein the orientable heat settable polymer comprises a major portion of the total weight, preferably at least 70%. Typical examples are multilayer parisons of poly(ethylene) terephthalate and copolyester; poly(ethylene) terephthalate, nylon and copolyester; poly(ethylene) terephthalate, adhesive, nylon, glue and poly(ethylene) terephthalate The process is also applicable to blends of poly(ethylene) terephthalate with polymers which provide desirable barrier properties wherein the poly(ethylene) terephtahlate comprises a major portion of the total weight, preferably at least 70%.

Thus, as used in the specification and claims, the term poly(ethylene) terephthalate shall include the above discussed materials containing poly(ethylene) terephthalate.

I claim:

1. A method for making a partially crystalline, biaxially oriented heat set hollow plastic container from a hollow parison of crystallizable material having an open end and a closed end comprising
   engaging the open end of a first plastic parison which is at a temperature within its molecular orientation temperature range,
   enclosing a hot mold about the parison at a first position,
   said mold being at heat setting temperature,
   simultaneously enclosing a cold mold at a second position about container previously blown in the hot mold to cool the previously blown container,
   expanding said plastic parison within said hot mold by internal pressurization through the open end to induce biaxial orientation of the plastic parison and force the plastic parison into intimate contact and conformance with the hot mold and to maintain contact by such internal pressurization between the mold and biaxially oriented container for a time sufficient to induce partial crystallization in the biaxially oriented container and to heat set said container,
   simultaneously moving the cold mold from said first position to said second position and the cold mold from said second position to a third position during the step of expanding the parison within the hot mold heat setting of the container in the hot mold and during the step of cooling of the previously blown container in the cold mold,
   thereafter providing a lower internal pressurization of the container in the hot mold and exhausting the pressurization in the cold mold to atmospheric pressure,
   substantially simultaneously opening the hot mold and cold mold,
   simultaneously moving the open hot mold from the second position to the first position and open cold mold from the third position to the second position,
   enclosing the hot mold at the first position about a second plastic parison which is at a temperature within its molecular orientation temperature range, and
   simultaneously enclosing the cold mold at the second position about the container previously blown from the first parison with the closing of the hot mold.

2. The method set forth in claim 1 including the step of axially stretching the parison by a stretch rod when the parison is within the hot mold at the first position.

3. The method set forth in claim 1 including the step of supporting successive parisons by an endless conveyor having longitudinally spaced mandrel assemblies on which the heated parisons are mounted, and closing said hot mold and cold mold about adjacent mandrel assemblies such that the parison conveyor is moved by the movement of the not mold and cold mold when the hot mold is moved from the first position to the second position and when the cold mold is moved from the second position to the third position and the conveyor remains stationary when the hot mold and cold mold are open.

4. The method set forth in claim 1 wherein said step of expanding said plastic parison in the hot mold comprises engaging a first source of fluid with said mandrel assembly when the hot mold is at said first position and said step of pressurizing said previously blown container comprises engaging a second source of fluid with said mandrel assembly when the blown container is enclosed by said cold mold at said second station, continuing the engagement of said first source and said second source while the hot mold is moved from the first position to said second position and said cold mold is moved from said second position to said third position.

5. The method set forth in claim 4 wherein the step of lowering the pressurization in said blown container comprises engaging a third source of fluid with said mandrel assembly when the blown container is enclosed in the hot mold when the hot mold is at the second station.

6. The method set forth in claim 1 including the step of engaging the blown container at the second position before opening the hot mold and maintaining engagement with the container while the cold mold is opened and is moved from the third position to the second position and until the cold mold is closed about a successive previously blown container such that the containers are maintained in position until the cold mold closes.

7. The method set forth in claim 6 wherein said step of engaging the container comprises engaging the open end of the container.

8. The method set forth in claim 1 including the steps of providing a mold base adjacent said hot mold and a mold base adjacent said cold mold and closing said hot mold and cold mold about their respective mold bases.

9. The method set forth in claim 8 including the step of supporting the mold bases on an endless conveyor such that the mold base conveyor is moved by the hot mold as the hot mold is moved from the first position to the second position and as the cold mold is moved from the second position to the third position.

10. The method set forth in claim 8 including moving the mold bases in unison with their respective mold- such that the mold base associated with the hot mold is moved with the hot mold between the first position and the second position and the mold base associated with the cold mold is moved between the second position and the third position.

11. The method set forth in claim 1 including the step of mechanically clamping the hot mold and cold mold in closed position thereby obviating the need for high pressure forces to hold the molds closed.

12. The method set forth in claim 11 wherein said step of mechanically clamping comprises mechanically hooking the mold sections together.

13. The method set forth in claim 1 wherein the step of moving said hot mold and cold mold comprises reciprocating said hot mold and cold mold in unison in a straight line between their respective positions.

14. A method for making a partially crystalline, biaxially oriented heat set hollow plastic container from a hollow parison of crystallizable material having an open end and a closed end comprising providing a plurality of interconnected mandrel assemblies which are movable in an endless path, a hot mold comprising mold sections with a plurality of cavities positioned along a portion of the endless path and movable between a first position and a second position, a cold mold comprising mold sections having a plurality of cavities positioned adjacent the hot mold and movable substantially simultaneously with the hot mold between said second position and a third position, delivering a plurality of hot parisons at a temperature within their molecular orientation temperature range to the mandrel assemblies, simultaneously enclosing the hot mold about the heated parisons on the mandrel assemblies and a cold mold about a plurality of previously blown containers on succeeding mandrel assemblies, expanding said plastic parisons within said hot mold by internal pressurization through the open end to induce biaxial orientation of the plastic parisons and force the plastic parison into intimate contact and conformance with the cavities of the hot mold and to maintain contact by such internal pressurization between the cavities of the mold and the biaxially oriented container for a time sufficient to induce partial crystallization in the biaxially oriented containers and to heat set said containers, cooling the cold mold while the parisons are being expanded and subjected to the heat of the hot mold, simultaneously moving the hot mold from the first position to the second position and the cold mold from the second position to a third position during the step of expanding of the parisons and heat setting the containers in the hot mold and the cooling of the container in the cold mold, moving the mandrel assemblies during the movement of the hot mold and cold mold by engagement of the hot mold and cold mold with said mandrel assemblies and during the movement of the hot mold and cold mold to the respective second position and third position, lowering the internal pressurization of the containers blown in the hot mold to prevent significant shrinkage, exhausting the pressurization of the containers in the cold mold, substantially simultaneously opening the hot mold and the cold mold, simultaneously returning the hot mold and cold mold to the first position and second position respectively, while the mandrel assemblies are maintained stationary, simultaneously closing the hot mold about a second plurality of heated parisons and the cold mold about the previously blown containers made in the hot mold about the first plurality of parisons.

15. The method set forth in claim 14 including the step of successively moving the mandrel assemblies to a third position by engagement and successive movements of the hot mold and cold mold to second and third positions such that the blown containers can be removed from the mandrel assemblies at positions beyond the third station.

16. The method set forth in claim 14 including the step of clamping the sections of the hot mold and cold mold when they are closed thereby obviating the need for high pressure forces to hold the molds closed.

17. The method set forth in claim 14 including the step of engaging the blown containers before the hot mold is opened to prevent inadvertent removal of the containers from the mandrel assemblies.

18. The method set forth in claim 14 including the step of heating the parisons prior to delivery to the mandrel assemblies.

19. The method set forth in claim 14 including the step of axially stretching each parison after the hot mold is closed while the hot mold is at the first position.

20. The method set forth in claim 14 including the steps of heating a plurality of parisons prior to application to the mandrel assemblies at a predetermined close spacing, changing the spacing of the heated parisons to that corresponding to a second spacing of the mandrel assemblies and delivering the parisons at said second spacing to the mandrel assemblies.

21. The method set forth in claim 14 wherein said hot and cold molds have a predetermined number of cavities which simultaneously enclose about an identical number of mandrel assemblies.

22. The method set forth in claim 21 including the steps of heating a plurality of parisons in an endless path prior to application to the mandrel assemblies at a predetermined close spacing, changing the spacing of the heated parisons to that corresponding to the spacing of the mandrel assemblies and delivering the parisons at said second spacing to the mandrel assemblies, and delivering a plurality of heated parisons at said increased spacing substantially simultaneously to the mandrel assemblies.

23. The method set forth in claim 21 comprising moving a plurality of parisons in closely spaced relationship in a path, heating said parisons at longitudinally spaced heating zones to heat the parisons to a temperature within the molecular orientation range, removing groups of said heated parisons, increasing the spacing between said removed parisons, and delivering said parisons at said increased spacing to said mandrel assemblies.

24. The method set forth in claim 23 wherein the step of moving the parisons through the heaters comprises positioning a first endless conveyor for movement through said heating zones, supporting said parisons on mandrels of said first conveyor, said step of removing said group of heated parisons comprises engaging the heated parisons and lifting the heated parisons vertically upwardly and said step of delivering said parisons comprises moving the parisons vertically downwardly.

25. The method set forth in claim 24 including the step of rotating the group of parisons about a vertical axes after they are lifted from the first conveyor and moving the group of parisons adjacent the molds.

26. The method set forth in claim 14 including the step of providing a plurality of interconnected bases movable in an endless path wherein a portion of the path is along the path of the hot mold and cold mold,
   moving each mold base between the hot molds and cold molds while the hot mold and cold mold are open such that when the hot mold and cold mold close, they close about respective mold bases, and when the hot mold and cold mold are moved longitudinally, the mold bases are also moved in the endless path by the movement of the hot mold and cold mold.

27. A method for making a partially crystalline, biaxially oriented heat set hollow plastic container from a hollow parison of crystallizable material having an open end and a closed end comprising
   (a) heating the parison to a temperature within its molecular orientation temperature range,
   (b) loading a parison on a first blowing means,
   (c) closing a hot blow mold which is at heat setting temperature about the parison,
   (d) simultaneously closing a cold mold about a previously blown and heat set container,
   (e) introducing fluid pressure through the blowing means to expand the parison against the confines of the hot mold and continuing the application and pressure to maintain the resultant container in intimate contact with the hot mold for a period of time sufficient to induce partial crystallization in the biaxially oriented container,
   (f) during step (e), transferring the closed hot mold, parison and blowing means to a second station,
   (g) simultaneously with steps (e) and (f), introducing fluid pressure through a second blowing means to force the previously blown and heat set container against the wall of the closed cold mold to reduce the temperature of the container to the quenching temperature and transferring the closed cold mold, previously blown container, and second blowing means to a third station,
   (h) while the containers remain supported, moving the open hot mold and open cold mold to the first and second respective positions,
   (i) opening the hot mold and cold mold while supporting the hot container which has been blown in the hot mold and the cold container which has been quenched in the cold mold, respectively, at the second and third stations, and
   (j) removing the previously quenched cold container at a subsequent station.

* * * * *